(12) United States Patent
Kim et al.

(10) Patent No.: US 9,503,240 B2
(45) Date of Patent: Nov. 22, 2016

(54) METHOD AND APPARATUS FOR PROVIDING DATA SERVICE USING BROADCASTING SIGNAL

(71) Applicant: Samsung Electronics Co. Ltd., Suwon-si, Gyeonggi-do (KR)

(72) Inventors: Younsun Kim, Seongnam-si (KR); Gil Kim, Yongin-si (KR); Juho Lee, Suwon-si (KR); Youngbum Kim, Seoul (KR); Joonyoung Cho, Suwon-si (KR); Hyoungju Ji, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 479 days.

(21) Appl. No.: 13/751,631

(22) Filed: Jan. 28, 2013

(65) Prior Publication Data

US 2013/0194951 A1    Aug. 1, 2013

Related U.S. Application Data

(60) Provisional application No. 61/591,534, filed on Jan. 27, 2012.

(51) Int. Cl.
| | |
|---|---|
| *H04L 5/00* | (2006.01) |
| *H04W 72/04* | (2009.01) |
| *H04W 72/00* | (2009.01) |
| *H04W 24/10* | (2009.01) |
| *H04W 4/00* | (2009.01) |
| *H04W 4/02* | (2009.01) |

(52) U.S. Cl.
CPC .......... *H04L 5/0053* (2013.01); *H04L 5/0092* (2013.01); *H04W 72/005* (2013.01); *H04W 72/0426* (2013.01); *H04L 5/001* (2013.01); *H04L 5/0023* (2013.01); *H04L 5/0035* (2013.01); *H04L 5/0048* (2013.01); *H04W 4/008* (2013.01); *H04W 4/023* (2013.01); *H04W 24/10* (2013.01)

(58) Field of Classification Search
CPC ............ H04W 72/0426; H04W 72/005; H04J 2211/001; H04L 12/1836; H04L 5/0092
See application file for complete search history.

(56) References Cited

U.S. PATENT DOCUMENTS

| | | | |
|---|---|---|---|
| 8,089,911 B2 | 1/2012 | Huang et al. | |
| 2007/0142053 A1 | 6/2007 | Soliman et al. | |
| 2007/0189261 A1 | 8/2007 | Choi et al. | |
| 2008/0009241 A1 | 1/2008 | Do et al. | |
| 2010/0111062 A1* | 5/2010 | Cho et al. | 370/338 |
| 2010/0278146 A1* | 11/2010 | Aoyama et al. | 370/331 |

(Continued)

FOREIGN PATENT DOCUMENTS

EP    2 403 186 A1    1/2012

*Primary Examiner* — Omer S Mian
(74) *Attorney, Agent, or Firm* — Jefferson IP Law, LLP

(57) ABSTRACT

A method and apparatus for providing a data service by using a broadcasting signal are provided. To transmit the broadcasting signal by an Access Point (AP) located within a coverage area of a base station (eNB), the AP transmits configuration information, used for transmission of the broadcasting signal on the same frequency band as that of the eNB, to the eNB, receives broadcasting signal transmission information, based on the configuration information, from the eNB, and transmits the broadcasting signal according to the broadcasting signal transmission information.

21 Claims, 20 Drawing Sheets

(56) References Cited

U.S. PATENT DOCUMENTS

2011/0136490 A1* 6/2011 Aoyagi ................ 455/443
2012/0129517 A1   5/2012 Fox et al.
2013/0044685 A1* 2/2013 Fong et al. ............ 370/328
2013/0109395 A1* 5/2013 Szufarska ......... H04W 36/0072
                                                 455/437
2013/0229971 A1* 9/2013 Siomina et al. .......... 370/312

* cited by examiner

METHOD AND APPARATUS FOR PROVIDING DATA SERVICE USING BROADCASTING SIGNAL

CROSS-REFERENCE TO RELATED APPLICATIONS

This application claims the benefit under 35 U.S.C. §119(e) of a U.S. Provisional application filed on Jan. 27, 2012 in the U.S. Patent and Trademark Office and assigned Ser. No. 61/591,534 the entire disclosure of which is hereby incorporated by reference.

BACKGROUND OF THE INVENTION

1. Field of the Invention

The present invention relates to a method and apparatus for providing a data service using a broadcasting signal. More particularly, the present invention relates to technology using a broadcasting signal to provide a data service of a Long Term Evolution-Advanced (LTE-A) base station through an Access Point (AP) within a coverage area of the base station.

2. Description of the Related Art

Mobile communication systems have been developed for the purpose of providing communication while maintaining the mobility of a user. As related technologies have advanced dramatically, such a mobile communication system is now able to provide a high-speed data communication service as well as a voice communication.

Nowadays, an LTE-A system, which is a next-generation mobile communication system, is being standardized by the $3^{rd}$ Generation Partnership Project (3GPP) Aiming for commercialization by about 2012, LTE-A is a technology capable of realizing high-speed packet-based communication having a transmission rate of up to 100 Mbps, which is higher than a currently provided data transmission rate. To support this transmission rate, several options have been discussed such as a plan to reduce the number of nodes located on communication lines by simplifying the structure of a network, a plan to make wireless protocols be as close to a radio channel as possible, and the like.

Multiple frequency bands may be used in conjunction to provide an enhanced data service to a User Equipment (UE) in an LTE-A network. For example, APs may be deployed within a macro coverage area of the LTE-A network in order to offload traffic from the LTE-A base station (i.e., an enhanced Node B (eNB)).

In this case, in order to determine whether or not to offload, a UE requires detection of APs in the UE's proximity. Also, in a case where APs utilize different frequency bands for data transmission compared to the LTE-A eNB, a UE needs to turn on its Radio Frequency (RF) and baseband circuitry to receive signals on the frequency bands used by the APs. Therefore, additional battery power consumption is undesirably caused.

Therefore, a need exists for a system and method for providing an enhanced data service without additional power consumption of a mobile terminal by using a broadcasting signal on the same frequency band as that of the LTE-A eNB in order to detect APs.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for providing an enhanced data service without additional power consumption of a mobile terminal by using a broadcasting signal on the same frequency band as that of the Long Term Evolution-Advanced (LTE-A) enhanced Node B (eNB) in order to detect Access Points (APs).

In accordance with an aspect of the present invention, a method for transmitting a broadcasting signal by an Access Point (AP) located within a coverage area of a base station (eNB) is provided. The method includes transmitting configuration information to the eNB, the configuration information being used for transmission of the broadcasting signal on the same frequency band as that of the eNB, receiving broadcasting signal transmission information from the eNB, the broadcasting signal transmission information being based on the configuration information, and transmitting the broadcasting signal according to the broadcasting signal transmission information.

In accordance with another aspect of the present invention, a method for receiving a broadcasting signal from an AP located within a coverage area of a base station (eNB) by a User Equipment (UE) is provided. The method includes transmitting device capability information to the eNB, receiving broadcasting signal reception information from the eNB, the broadcasting signal reception information being used to receive the broadcasting signal of the AP, receiving and measuring the broadcasting signal transmitted from the AP on the same frequency band as that of the eNB, and transmitting a measurement report of the broadcasting signal to the eNB.

In accordance with still another aspect of the present invention, a method for controlling a broadcasting signal transmission of an AP located within a coverage area of a base station (eNB) is provided. The method includes receiving configuration information from the AP, the configuration information being used for the broadcasting signal transmission, transmitting broadcasting signal transmission information to the AP, the broadcasting signal transmission information being used for the AP to transmit a broadcasting signal on the same frequency band as that of the eNB, based on device capability information received from a UE, generating broadcasting signal reception information used for the UE to receive the broadcasting signal from the AP, and transmitting the broadcasting signal reception information to the UE, and receiving a measurement report of the broadcasting signal from the UE.

In accordance with yet another aspect of the present invention, an apparatus for transmitting a broadcasting signal within a coverage area of a base station (eNB) is provided. The apparatus includes an eNB Transmission/Reception (TX/RX) unit configured to transmit configuration information to the eNB, the configuration information being used for transmission of the broadcasting signal on the same frequency band as that of the eNB, and configured to receive broadcasting signal transmission information from the eNB, the broadcasting signal transmission information being based on the configuration information, and a broadcasting signal transmitter configured to transmit the broadcasting signal according to the broadcasting signal transmission information.

In accordance with yet another aspect of the present invention, an apparatus for receiving a broadcasting signal from an AP located within a coverage area of a base station (eNB) is provided. The apparatus includes an eNB TX/RX unit configured to transmit device capability information to the eNB, and configured to receive broadcasting signal reception information from the eNB, the broadcasting signal reception information being used to receive the broadcasting signal of the AP, a broadcasting signal receiver configured to receive the broadcasting signal transmitted from the AP on the same frequency band as that of the eNB, and a controller configured to measure the received broadcasting signal and configured to transmit a measurement report of the broadcasting signal to the eNB.

In accordance with yet another aspect of the present invention, an apparatus for controlling a broadcasting signal transmission of an AP located within a coverage area of a base station (eNB) is provided. The apparatus includes an AP TX/RX unit configured to receive configuration information from the AP, the configuration information being used for the broadcasting signal transmission, and configured to transmit broadcasting signal transmission information to the AP, the broadcasting signal transmission information being used for the AP to transmit a broadcasting signal on the same frequency band as that of the eNB, and a UE TX/RX unit configured to, based on device capability information received from the UE, transmit broadcasting signal reception information to the UE, the broadcasting signal reception information being used for the UE to receive the broadcasting signal from the AP, and configured to receive a measurement report of the broadcasting signal from the UE.

These exemplary methods and apparatuses allow APs within an eNB's coverage area to transmit broadcasting signals for AP detection on the same frequency band as that of the eNB and thereby permit a UE to effectively detect APs without additional power consumption.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
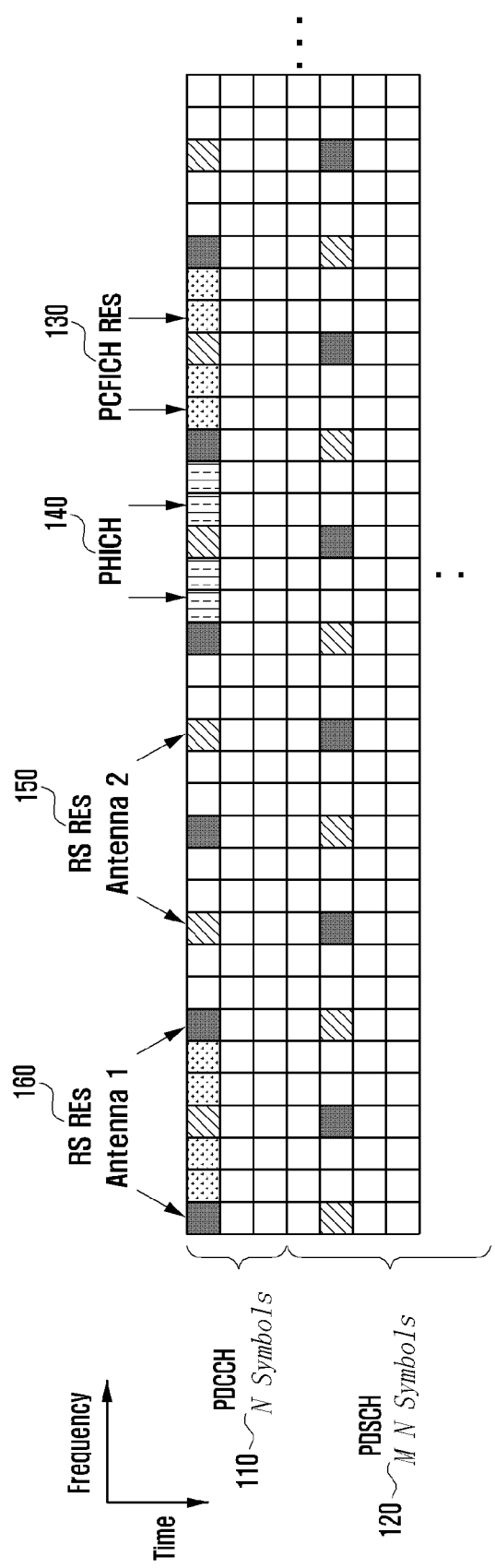
FIG. 1 illustrates a structure for a control region in a DownLink Transmission Time Interval (DL TTI) according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, well known or widely used techniques, elements, structures, and processes may not be described or illustrated in detail to avoid obscuring the essence of the present invention. Although the drawings represent exemplary embodiments of the present invention, the drawings are not necessarily to scale and certain features may be exaggerated or omitted in order to better illustrate and explain the present invention.

In this disclosure, Orthogonal Frequency Division Multiplexing (OFDM)-based wireless communication systems, especially $3^{rd}$ Generation Partnership Project (3GPP) Evolved Universal Mobile Telecommunications System (UMTS) Terrestrial Radio Access (EUTRA) standards, are discussed exemplarily. However, as will be appreciated by those skilled in the art, the subject matter of the present invention may be favorably applied to any other communication systems having similar technical background and channel forms.

A communication system includes a DownLink (DL) that conveys signals from one or more Transmission Points (TPs) to a User Equipment (UE), and an UpLink (UL) that conveys signals from a UE to one or more Reception Points (RPs). A UE, also commonly referred to as a terminal or a mobile station, may be fixed or mobile and may be a wireless device, a cellular phone, a personal computer device, etc. A TP or a RP is generally a fixed station and may also be referred to as a Base Transceiver System (BTS), a Node B, an enhanced Node B (eNB), an access point, etc.

A communication system also supports the transmission of several signal types for its proper functionality including data signals conveying information content, control signals enabling proper processing of data signals, and Reference Signals (RS), also known as pilots, enabling coherent demodulation of data or control signals or providing Channel State Information (CSI) corresponding to an estimate of the channel medium experienced by their transmission.

UL data information is conveyed through a Physical UL Shared CHannel (PUSCH). UL Control Information (UCI) is conveyed through a Physical UL Control CHannel (PUCCH) unless a UE also has a PUSCH transmission in which case the UE may convey at least some UCI together with data information through the PUSCH. The UCI includes ACKnowledgement information associated with the use of a Hybrid Automatic Repeat reQuest (HARQ) process. The HARQ-ACK is in response to the reception by the UE of Transport Blocks (TBs) in the DL of the communication system, which corresponds to signal transmission from the Node B to the UE.

The DL TBs are transmitted through a Physical Downlink Shared CHannel (PDSCH). The UCI may also include a Channel Quality Indicator (CQI), a Precoding Matrix Indicator (PMI), or a Rank Indicator (RI), which may be jointly referred to as Channel State Information (CSI).

The CQI provides to the Node B a measure of the Signal to Interference and Noise Ratio (SINR) the UE experiences over sub-bands or over the whole operating DL BandWidth (BW). This measure is typically in the form of the highest Modulation and Coding Scheme (MCS) for which a predetermined BLock Error Rate (BLER) can be achieved for the transmission of TBs. The PMI/RI informs the Node B of how to combine the signal transmission to the UE from multiple Node B antennas in accordance with the Multiple-Input Multiple-Output (MIMO) principle. A UE may transmit UCI either separately from data information in a PUCCH or together with data information in a PUSCH.

DL data information is conveyed through a PDSCH. DL Control Information (DCI) includes DL CSI feedback request to UEs, Scheduling Assignments (SAs) for PUSCH transmissions from UEs (UL SAs) or for PDSCH receptions by UEs (DL SAs). The SAs are conveyed through DCI formats transmitted in respective Physical DL Control CHannels (PDCCHs). In addition to SAs, PDCCHs may convey DCI that is common to all UEs or to a group of UEs.

DCI also includes HARQ-ACK information that one or more TPs transmit to UEs through Physical HARQ-ACK Indicator CHannels (PHICHs) in response to respective receptions of data TBs transmitted from the UEs to RPs.

Typically, the PDCCHs are a major part of the total DL overhead. One method for reducing this overhead is to scale its size according to the resources required to transmit the PDCCHs and PHICHs. Assuming Orthogonal Frequency Division Multiple Access (OFDMA) as the DL transmission method, a Control Channel Format Indicator (CCFI) parameter can be transmitted through the Physical Control Format Indicator CHannel (PCFICH) to indicate the number of OFDM symbols allocated to the DL control region during a DL Transmission Time Interval (TTI).

FIG. 1 illustrates a structure for a control region in a DL TTI according to an exemplary embodiment of the present invention.

Referring to FIG. 1, the DL control region occupies the first N subframe symbols 110. The remaining M−N subframe symbols are assumed to be primarily used for PDSCH transmissions 120. The PCFICH 130 is transmitted in some sub-carriers, also referred to as Resource Elements (REs), of the first symbol. The PCFICH 130 is assumed to convey 2 bits indicating a PDCCH size of M=1, or M=2, or M=3 subframe symbols. The PHICH 140 is also transmitted in some REs of the first subframe symbol. Moreover, some subframe symbols also contain RS REs, 150 and 160, that are common to all UEs for each of the transmitter antennas, which, in FIG. 1, are assumed to be two. The main purposes of the UE-Common RS (CRS) are to enable a UE to obtain a channel estimate for its DL channel medium and to perform other measurements and functions as they are known in the art. The remaining REs in the DL control region are used to transmit PDCCH.

PDCCH conveying SAs are not transmitted at predetermined locations in a DL control region and, as a consequence, each UE needs to perform multiple decoding operations to determine whether it has a SA in a DL subframe. To assist a UE with the multiple decoding operations, the REs carrying each PDCCH are grouped into Control Channel Elements (CCEs) in the logical domain. For a given number of DCI format bits, the number of CCEs for the DCI format transmission depends on the channel coding rate (Quadrature Phase Shift Keying (QPSK) is assumed as the modulation scheme). For UEs experiencing low or high Signal-to-Interference and Noise Ratio (SINR) in the DL, the serving TPs may respectively use a low or high channel coding rate for the PDCCH transmission in order to achieve a desired BLock Error Rate (BLER). Therefore, a PDCCH transmission to a UE experiencing low DL SINR may typically require more CCEs that a PDCCH transmission to a UE experiencing high DL SINR (different power boosting of the REs of a CCE transmission may also be used). Typical CCE aggregation levels for a PDCCH transmission are, for example, of 1, 2, 4, and 8 CCEs.

For a PDCCH decoding process, a UE may determine a search space for candidate PDCCHs, after it restores the CCEs in the logical domain, according to a common set of CCEs for all UEs (UE Common Search Space (UE-CSS)) and according to a UE-dedicated set of CCEs (UE-Dedicated Search Space (UE-DSS)).

The UE-CSS may consist of the first $N_{CCE}^{UE-CSS}$ CCEs in the logical domain.

The UE-DSS may be determined according to a pseudo-random function having as inputs UE-common parameters, such as the subframe number or the total number of CCEs in the subframe, and UE-specific parameters such as the UE identity (UE_ID). For example, for CCE aggregation levels $L \in \{1,2,4,8\}$, the CCEs for PDCCH candidate m are given by Equation 1.

$$L \cdot \{(Y_k+m) \bmod \lfloor N_{CCE,k}/L \rfloor\} + i \qquad \text{Equation 1}$$

In Equation 1, $N_{CCE,k}$ is the total number of CCEs in subframe k, $i=0, \ldots, L-1$, $m=0, \ldots, M^{(L)}-1$, $M^{(L)}$ is the number of PDCCH candidates to monitor in a search space, and $\lfloor \ \rfloor$ is the "floor" function rounding a number to its immediately smaller integer. Exemplary values of $M^{(L)}$ for $L \in \{1,2,4,8\}$ are, respectively, $\{0, 0, 4, 2\}$ in the UE-CSS, and $\{6, 6, 2, 2\}$ in the UE-DSS. For the UE-CSS, $Y_k=0$. For the UE-DSS, $Y_k=(A \cdot Y_{k-1}) \bmod D$ where $Y_{-1}=\text{UE\_ID} \neq 0$, $A=39827$ and $D=65537$.

PDCCHs conveying information to multiple UEs, such as for example a PDCCH conveying Transmission Power Control (TPC) commands for UEs to adjust their PUSCH or PUCCH transmission powers, are transmitted in the UE-CSS. Additionally, if enough CCEs remain in the UE-CSS after the transmission of PDCCHs conveying DCI to multiple UEs in a subframe, the UE-CSS may also be used to transmit PDCCH conveying SAs with some specific DCI formats.

The UE-DSS is exclusively used to transmit PDCCHs providing SAs. For example, the UE-CSS may consist of 16 CCEs and support 2 PDCCHs with L=8 CCEs, or 4 PDCCHs with L=4 CCEs, or 1 PDCCH with L=8 CCEs and 2 PDCCHs with L=4 CCEs. The CCEs for the UE-CSS are placed first in the logical domain (prior to interleaving).

Figure 2:
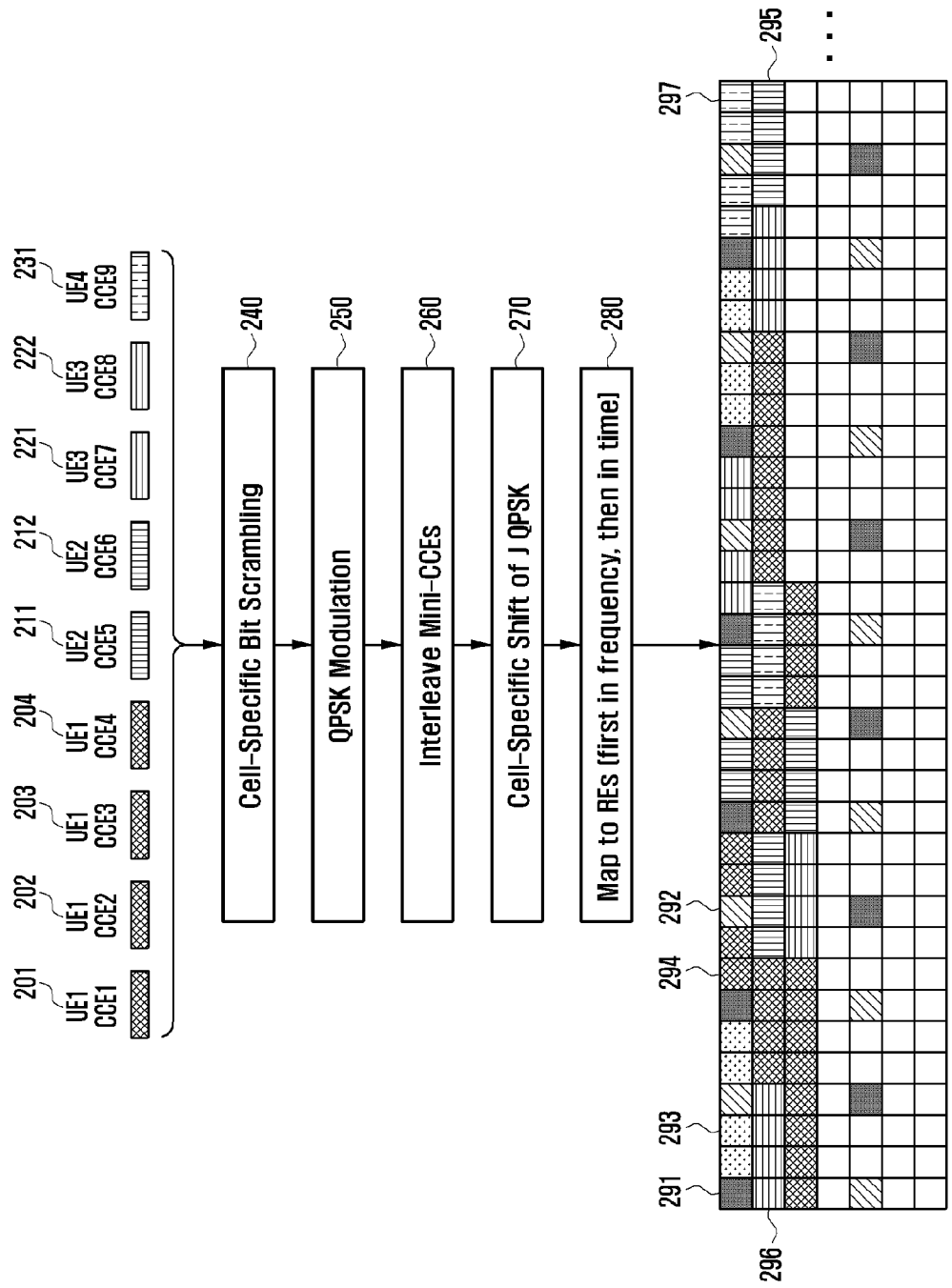
FIG. 2 illustrates a Physical Downlink Control CHannel (PDCCH) transmission process according to an exemplary embodiment of the present invention.

FIG. 2 illustrates a PDCCH transmission process according to an exemplary embodiment of the present invention.

Referring to FIG. 2, after channel coding and rate matching, the encoded bits of DCI formats are mapped to CCEs in the logical domain. The first 4 CCEs (L=4), CCE1 201, CCE2 202, CCE3 203, and CCE4 204 are used for PDCCH transmission to UE1. The next 2 CCEs (L=2), CCE5 211 and CCE6 212, are used for PDCCH transmission to UE2. The next 2 CCEs (L=2), CCE7 221 and CCE8 222, are used for PDCCH transmission to UE3. Finally, the last CCE (L=1), CCE9 231, is used for PDCCH transmission to UE4.

In step 240, the DCI format bits of a PDCCH may be scrambled with a binary scrambling code and are subsequently modulated in step 250. Each CCE is further divided into Resource Element Groups (REGs). For example, a CCE consisting of 36 REs can be divided into 9 REGs, each consisting of 4 REs. In step 260, interleaving is applied among REGs (blocks of 4 QPSK symbols). For example, a block interleaver may be used where the interleaving is performed on symbol-quadruplets (4 QPSK symbols corresponding to the 4 REs of a REG) instead of on individual bits.

After interleaving the REGs, the resulting series of QPSK symbols may be shifted by J symbols in step 270, and finally each QPSK symbol is mapped to an RE in the DL control region of a subframe in step 280. Therefore, in addition to the RS from the transmitter antennas, 291 and 292, and other control channels such as a PCFICH or a PHICH 293, the REs in the DL control contain QPSK symbols corresponding to DCI format for UE1 294, UE2 295, UE3 296, and UE4 297.

Figure 3:
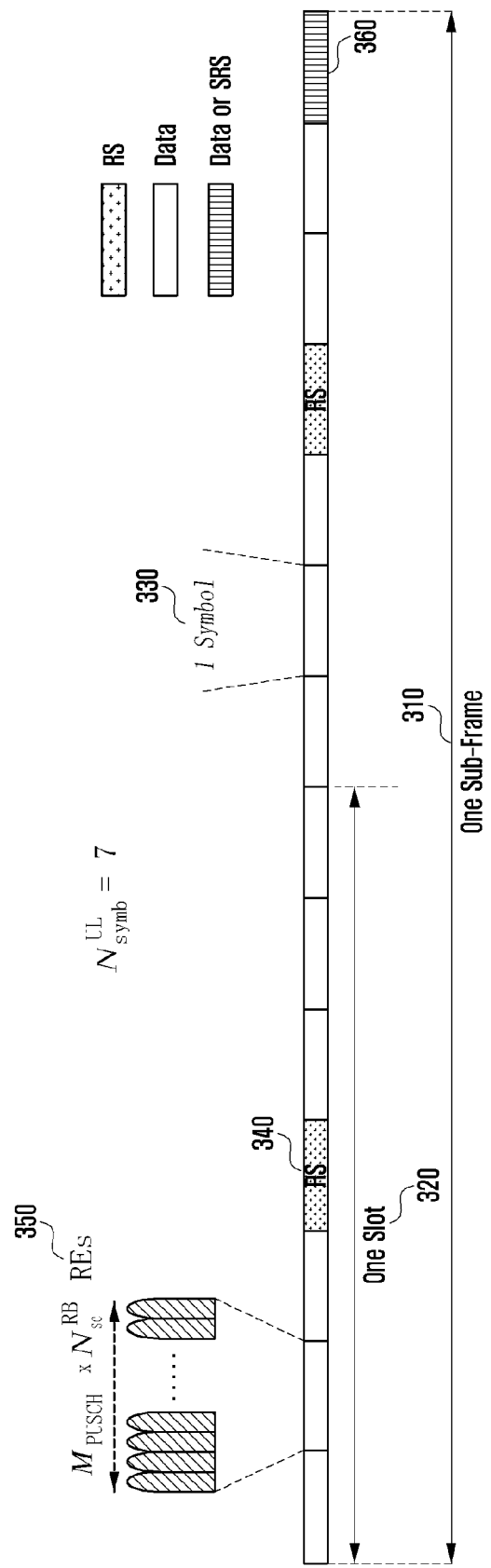
FIG. 3 illustrates a Physical Downlink Shared CHannel (PUSCH) transmission structure according to an exemplary embodiment of the present invention.

FIG. 3 illustrates a PUSCH transmission structure according to an exemplary embodiment of the present invention.

Referring to FIG. 3, the Transmission Time Interval (TTI) consists of one sub-frame 310 which includes two slots. Each slot 320 includes $N_{symb}^{UL}$ symbols used for the transmission of data signals, UCI signals, or Reference Signals (RS). Each symbol 330 includes a Cyclic Prefix (CP) to mitigate interference due to channel propagation effects.

The PUSCH transmission in one slot may be either at the same BW or at a different BW than the PUSCH transmission in the other slot. Some symbols in each slot are used to transmit RS 340, which enables channel estimation and coherent demodulation of the received data and/or UCI signals. The transmission BW consists of frequency resource units which will be referred to as Physical Resource Blocks (PRBs). Each PRB consists of NRB $N_{sc}^{RB}$ sub-carriers, or Resource Elements (REs), and a UE is allocated $M_{PUSCH}$ PRBs 350 for a total of $M_{sc}^{PUSCH}=M_{PUSCH} \cdot N_{sc}^{RB}$ REs for the PUSCH transmission BW.

The last sub-frame symbol may be used for the transmission of Sounding RS (SRS) 360 from one or more UEs. The main purpose of the SRS is to provide the Node B a CQI estimate for the UL channel medium for the respective UE. The SRS transmission parameters for each UE are semi-statically configured by the Node B through higher layer signaling. The number of sub-frame symbols available for data transmission is given by Equation 2.

$$N_{symb}^{PUSCH}=2 \cdot (N_{symb}^{UL}-1)-N_{SRS} \qquad \text{Equation 2}$$

In Equation 2, $N_{SRS}=1$ if the last sub-frame symbol is used for SRS transmission and $N_{SRS}=0$ otherwise.

Figure 4:
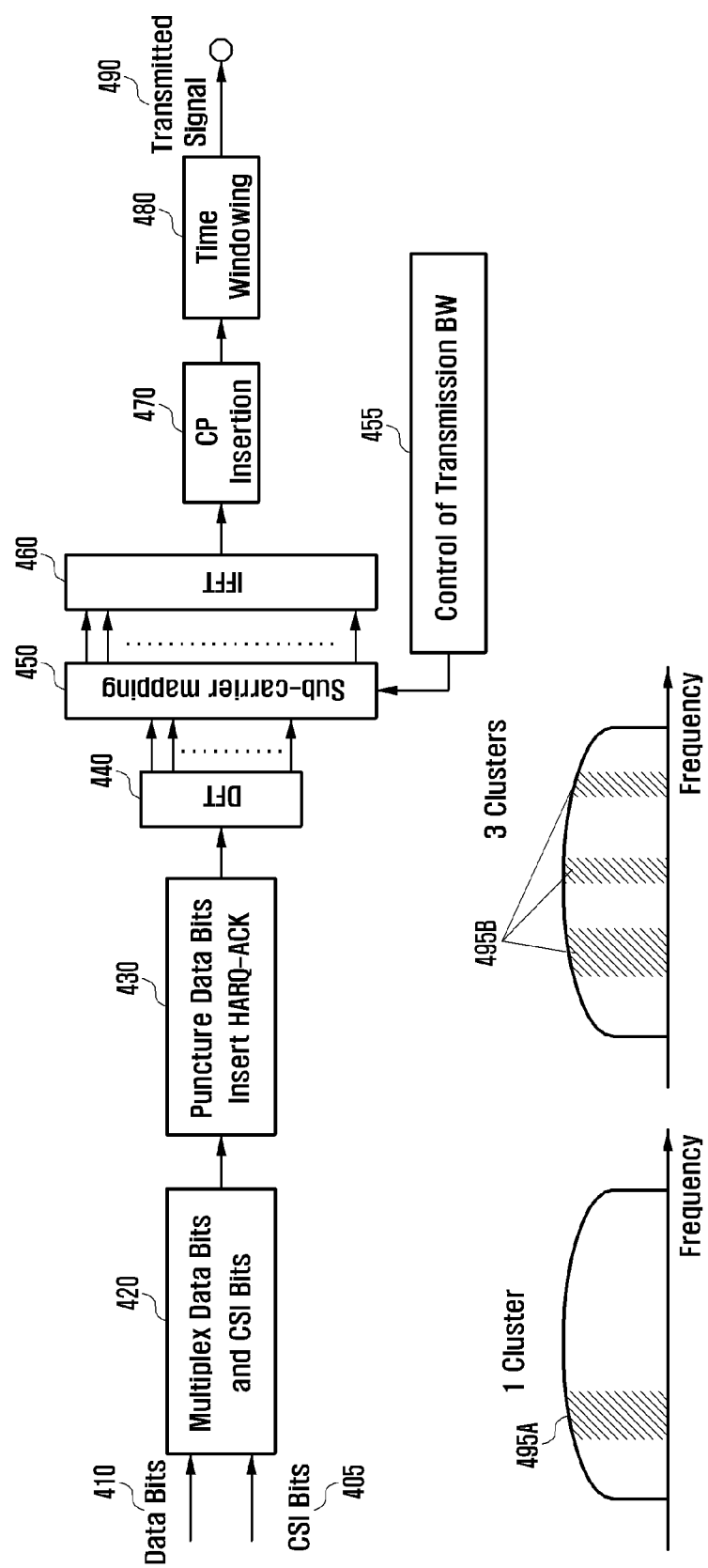
FIG. 4 illustrates a transmitter block diagram for the transmission of data, Channel State Information (CSI), and Hybrid Automatic Repeat request-ACKnowledgement (HARQ-ACK) signals in a PUSCH according to an exemplary embodiment of the present invention.

FIG. 4 illustrates a transmitter block diagram for the transmission of data, CSI, and HARQ-ACK signals in a PUSCH according to an exemplary embodiment of the present invention.

Referring to FIG. 4, coded CSI bits 405 and coded data bits 410 are multiplexed 420. HARQ-ACK bits are then inserted by puncturing data bits and/or CSI bits 430. The Discrete Fourier Transform (DFT) is then obtained 440, the REs 450 corresponding to the PUSCH transmission BW are selected 455, the Inverse Fast Fourier Transform (IFFT) is performed 460 and finally the CP 470 and filtering 480 are applied to obtain a signal for transmission 490.

For brevity, additional transmitter circuitry such as a digital-to-analog converter, analog filters, amplifiers, and transmitter antennas are not illustrated. Also, the encoding process for the data bits and the CSI bits, as well as the modulation process for all transmitted bits, are omitted for brevity. The PUSCH transmission is assumed to be over clusters of contiguous REs in accordance with the DFT Spread Orthogonal Frequency Multiple Access (DFT-S-OFDM) method allowing signal transmission over one cluster 495A (also known as Single-Carrier Frequency Division Multiple Access (SC-FDMA)), or over multiple non-contiguous clusters 495B.

At the receiver, the reverse (complementary) transmitter operations are performed. This is illustrated in FIG. 5 where the reverse operations of those illustrated in FIG. 4 are performed.

Figure 5:
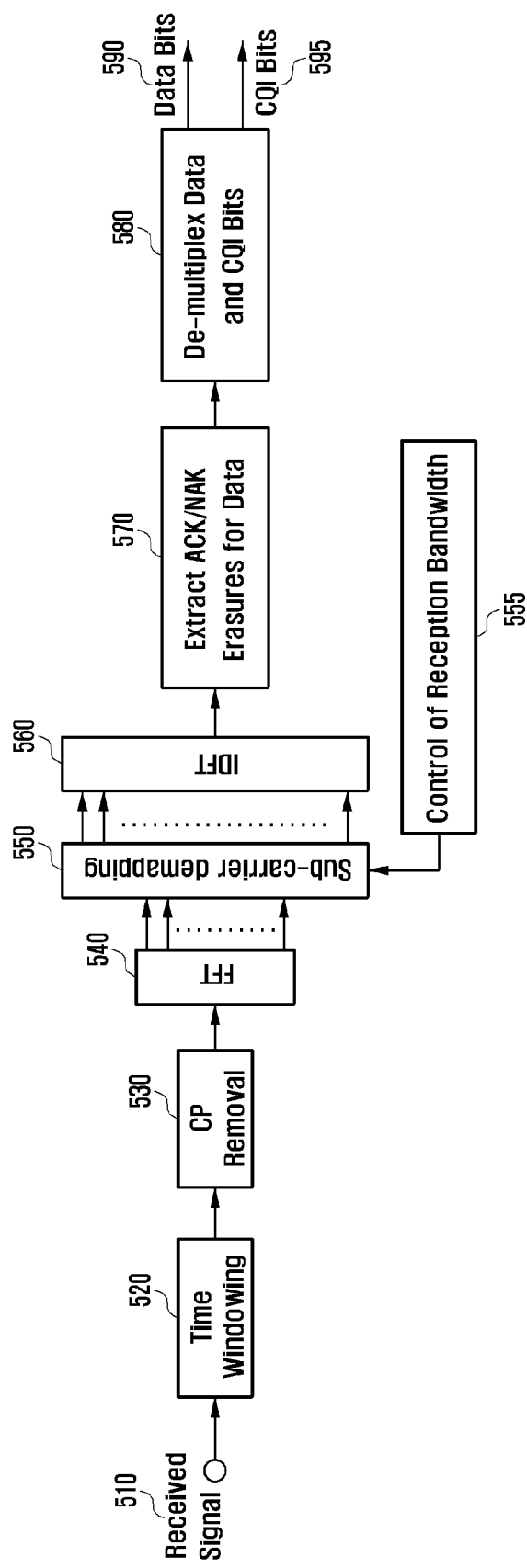
FIG. 5 illustrates a receiver block diagram in which reverse transmitter operations are performed according to an exemplary embodiment of the present invention.

FIG. 5 illustrates a receiver block diagram in which reverse transmitter operations are performed according to an exemplary embodiment of the present invention.

Referring to FIG. 5, after an antenna receives the Radio-Frequency (RF) analog signal and after further processing units (such as filters, amplifiers, frequency down-converters, and analog-to-digital converters), which are not shown for brevity, the digital signal 510 is filtered 520 and the CP is removed 530. Subsequently, the receiver unit applies a Fast Fourier Transform (FFT) 540, selects 550 the REs 555 used by the transmitter, applies an Inverse DFT (IDFT) 560, extracts HARQ-ACK bits 570, and de-multiplexes 580 the data bits 590 and CSI bits 595. As for the transmitter, well known receiver functionalities such as channel estimation, demodulation, and decoding are not shown for brevity.

In order to support higher data rates than possible in legacy communication systems, aggregation of multiple Component Carriers (CCs) (which is called as Carrier Aggregation (CA)) is considered in both the DL and the UL to provide higher operating BWs. For example, to support communication over 60 MHz, aggregation of three 20 MHz CCs can be used.

Figure 6:
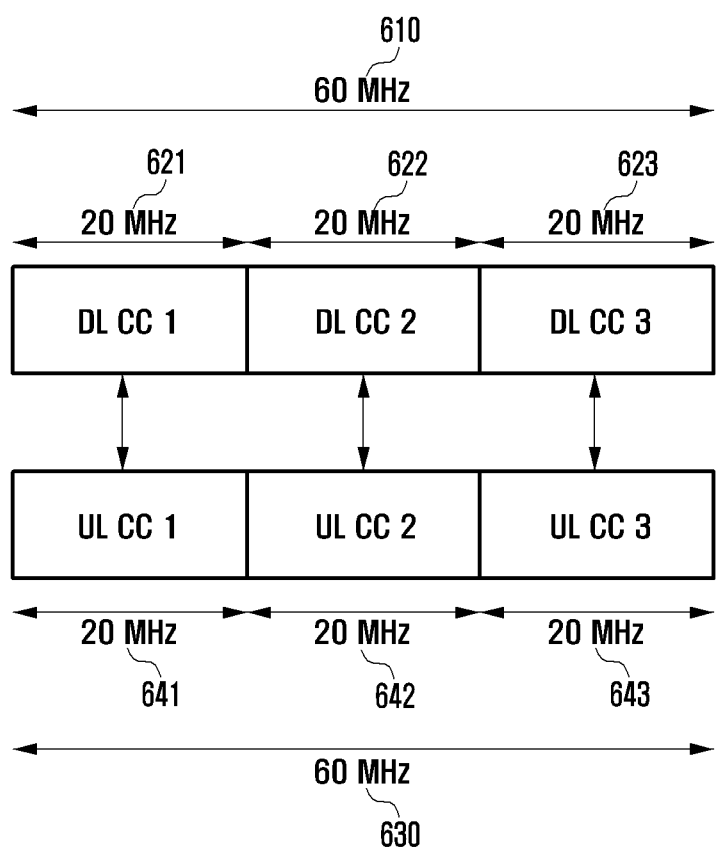
FIG. 6 illustrates the principle of Carrier Component (CC) aggregation according to an exemplary embodiment of the present invention.

FIG. 6 illustrates the principle of CC aggregation according to an exemplary embodiment of the present invention.

Referring to FIG. 6, an operating DL BW of 60 MHz 610 is constructed by the aggregation of 3 (contiguous, for simplicity) DL CCs, 621, 622, 623, each having a BW of 20 MHz. Similarly, an operating UL BW of 60 MHz 630 is constructed by the aggregation of 3 UL CCs, 641, 642, 643, each having a BW of 20 MHz.

For simplicity, in the example of FIG. 6, each DL CC is assumed to be uniquely mapped to an UL CC (symmetric CC aggregation) but it is also possible for more than 1 DL CC to be mapped to a single UL CC or for more than 1 UL CC to be mapped to a single DL CC (asymmetric CC aggregation, not shown for brevity). The link between DL CCs and UL CCs is typically UE-specific.

The Node B configures CCs to a UE using higher layer signaling, such as for example Radio Resource Control (RRC) signaling. The RRC-configured DL CCs can be activated or deactivated by Medium Access Control (MAC) signaling or PHYsical (PHY) layer signaling. Activation/deactivation for each RRC-configured UL CC is determined by the activation/deactivation of its linked DL CC.

Activation of a DL (UL) CC for a UE means that the UE can receive PDSCH (transmit PUSCH) in that CC; the reverse applies for deactivation of a DL (UL) CC. In order to maintain communication, one DL CC, and one UL CC linked to that DL CC, need to remain activated and they will be respectively referred to as DL Primary CC (DL PCC) and UL Primary CC (UL PCC).

Aperiodic CSI report via PUSCH is triggered by a CSI Request field in PDCCH. In the following description, the serving cell is corresponding to the each Carrier Component (CC). Upon decoding an indication sent in the scheduling grant for serving cell c, aperiodic CSI reporting is performed using PUSCH on serving cell c. If the CQI request field is 1 bit, a report is triggered if CQI request field is set to '1'. If the CQI request field is 2 bits, a report is triggered as shown in Table 1.

TABLE 1

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a 1st set of serving cells configured by higher layers |
| '11' | Aperiodic CSI report is triggered for a 2nd set of serving cells configured by higher layers |

For example, when Carrier Indicator Field (CIF) is 1 (bits '001') and CSI Request field is '01', then the CSI of DL CC 1 which is linked to UL CC1 due to CIF is fed back to Node B. When CSI Request field is '10', then depending on the higher layer configuration, the CSI(s) of DL CC(s) is/are fed back to Node B.

Improving coverage and cell-edge throughput are key objectives in communication systems. Coordinated Multi-Point transmission/reception (CoMP) is an important technique to achieve these objectives. CoMP operation relies on the fact that when a UE is in a cell-edge region, it may be able to reliably receive signals from a set of TPs (DL CoMP) and reliably transmit signals to a set of RPs (UL CoMP).

DL CoMP schemes can range from simple schemes of interference avoidance, such as coordinated scheduling, to more complex schemes requiring accurate and detailed channel information such as joint transmission from multiple TPs. UL CoMP schemes can also range from simple schemes where PUSCH scheduling is performed considering a single RP to more complex schemes where the received signal characteristics and the generated interference at multiple RPs are considered.

Figure 7:
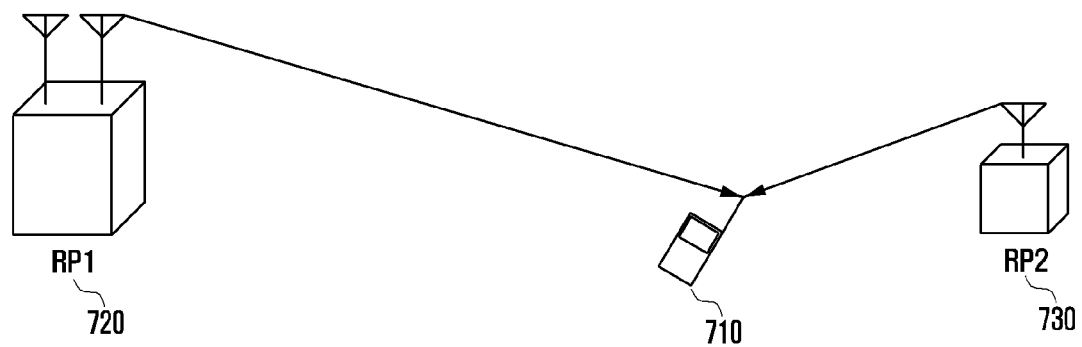
FIG. 7 illustrates a DownLink (DL) Coordinated Multi-Point transmission/reception (CoMP) operation according to an exemplary embodiment of the present invention.

FIG. 7 illustrates a DL CoMP operation according to an exemplary embodiment of the present invention.

Referring to FIG. 7, a signal transmitted by two RPs, RP1 720 and RP2 730 is received from a UE 710. Scheduling coordination between the two RPs and combining of the transmitted signals can be facilitated by a fast backhaul link such as an optical fiber link.

Support of DL CoMP introduces new CSI feedback for various CoMP schemes. As legacy CSI feedback considers only one Transmission Point (TP) and one CSI reference signal for the channel measurement and CSI feedback report, it is not possible to support the CoMP schemes from multiple transmission points which utilize multiple CSI reference signals. For this reason, the additional CSI feedback for multiple TP (or CSI feedback for corresponding Channel Status Information-Reference Signal (CSI-RS) configurations) is required to support DL CoMP schemes. Feedback for CoMP schemes can be categorized as follows.

Multiple CSI reports for multiple TPs
  Node B configures multiple CSI-RS configurations to a UE for CSI reports.
  Each CSI-RS configuration corresponds to a specific TP.
   The case where one CSI-RS configuration corresponds to multiple TPs is also included.

The set of multiple CSI-RS configurations (or the corresponding TPs) for CSI reports is defined as "feedback set (or measurement set)".

Each CSI report corresponds to a CSI-RS configuration for a TP.

Additional feedback for Dynamic point Selection with Dynamic Blanking (DS/DB)

Some TPs (e.g. macro Node B) can be turned off (blanking) in order to help downlink data reception of UEs attached to other TPs.

One UE needs to feedback additional CSI for blanking.

Additional feedback for Joint Transmission (JT)

Multiple TPs can simultaneously transmit data for one UE.

JT may require additional CSI for co-transmission from multiple TPs.

The CSI report for CoMP may be transmitted either separately from data information in a PUCCH or together with data information in a PUSCH. Therefore, there is a need to provide CSI report for CoMP via PUSCH and PUCCH respectively.

The need to provide CSI report for CoMP via PUSCH is associated with an increased size of CSI feedback information. Because multiple CSI reports are required for CoMP, the amount of feedback is insufficient for PUCCH when multiple CSI reports are fed back simultaneously.

There is another need to provide CSI report for CoMP via PUSCH to include additional feedback for DS/DB or JT. These CoMP schemes require not only per-TP CSI feedback but also additional CSI feedback which is conditioned on certain interference assumptions, or which includes inter-TP information for co-transmission from multiple TPs.

Figure 8:
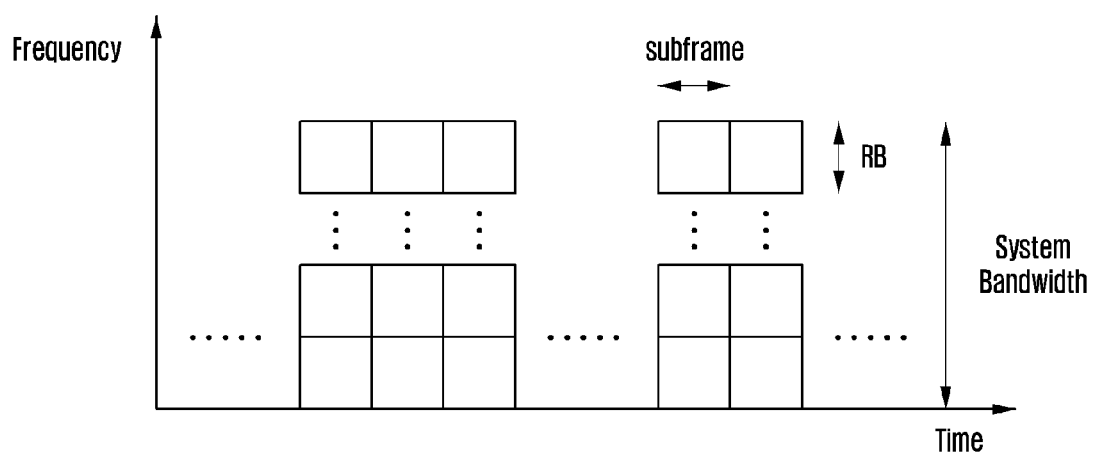
FIG. 8 illustrates a system bandwidth of Long Term Evolution-Advanced (LTE-A) according to an exemplary embodiment of the present invention.

FIG. 8 illustrates a system bandwidth of Long Term Evolution-Advanced (LTE-A) according to an exemplary embodiment of the present invention.

Referring to FIG. 8, downlink transmission of LTE and LTE-A are made in units of subframes in the time domain and RBs in the frequency domain. A subframe equals 1 msec of transmission time while an RB equals 180 kHz of transmission bandwidth consisting of 12 subcarriers. The system bandwidth of LTE-A consists of multiple RBs in the frequency domain and multiple subframes in the time domain as depicted in FIG. 8.

A number of different signals are transmitted for LTE-A Release 10 and releases after Release 10. In the DL, the following reference signals are transmitted:

Cell Specific Reference Signal (CRS): Used for initial system access, paging, PDSCH demodulation, channel measurement, handover, etc.

Demodulation Reference Signal (DMRS): Used for demodulation of PDSCH

CSI-RS: Used for channel measurement

In addition to the above reference signals, zero-power CSI-RS can be applied in LTE-A Release 10. Zero-power CSI-RS can occur in the same time and frequency resources as CSI-RS but differs from CSI-RS in that there is no signal transmitted on the REs which are subject to zero-power CSI-RS. The purpose of zero-power CSI-RS is to not transmit on resources which are used by neighboring TPs for CSI-RS transmission so as to not generate interference on these CSI-RS transmitted by neighboring TPs. The resources which are used for transmission of the above reference signals, zero power CSI-RS, PDSCH, control channels are depicted in FIG. 9.

Figure 9:
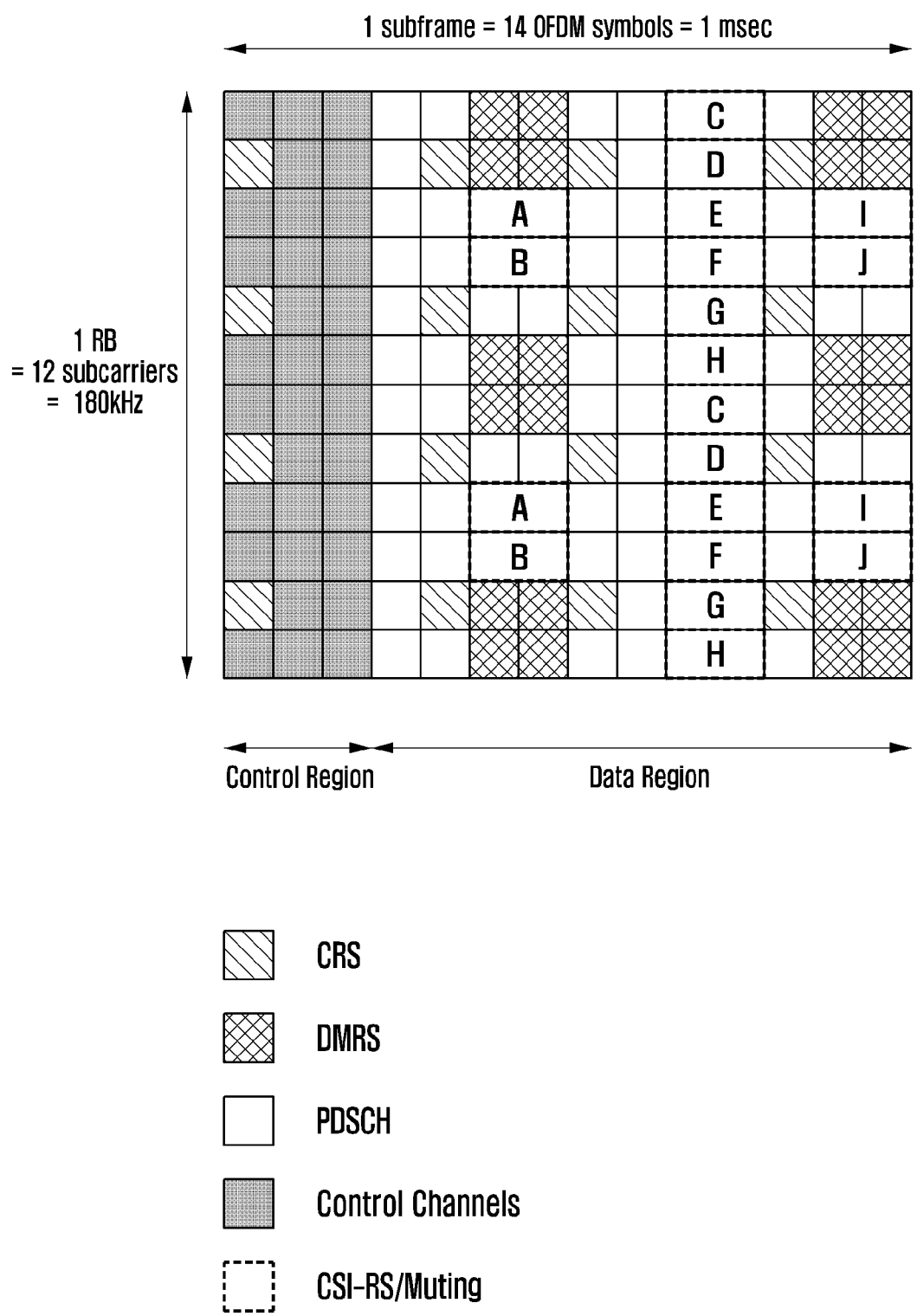
FIG. 9 illustrates a location of resources used for transmission of different reference signals, PDSCH, zero power Channel Status Information-Reference Signal (CSI-RS), and control channels according to an exemplary embodiment of the present invention.

FIG. 9 depicts the location of resources used for transmission of different reference signals, PDSCH, zero power CSI-RS and control channels according to an exemplary embodiment of the present invention. It is noted that the above diagram is for a single RB in the frequency domain for a single subframe in the time domain. For each subframe, multiple RBs may exist and the above signals can be transmitted on multiple RBs in a similar manner as shown in FIG. 9.

Referring to FIG. 9, the resources marked by alphabets A, B, C, D, E, F, G, H, I, and J correspond to locations of transmissions for CSI-RS having 4 antenna ports. For example, in the 4 REs marked by 'A', CSI-RS having 4 antenna ports can be transmitted. CSI-RS having 2 antenna ports can be transmitted on resources which are obtained by dividing the resources for CSI-RS having 4 antenna ports into 2. Additionally, CSI-RS having 8 antenna ports can be transmitted on resources which are obtained by combining the 2 resources for CSI-RS having 4 antenna ports. Zero-power CSI-RS can be applied on the resources for CSI-RS having 4 antenna ports.

Multiple frequency bands can be used in conjunction to provide enhanced data service to mobile terminals in an LTE-A network. One such alternative is to deploy APs based on a radio access technology other than LTE-A which utilizes different frequency bands compared to the LTE-A system within the macro coverage area of the LTE-A system. Some examples of such radio access technologies can be WiFi (802.11x where 'x' can be a, b, g, n, ac, etc), WiBro/WiMax, telecommunication systems on unlicensed bands, telecommunication systems on millimeter bands (where the carrier frequency is higher than 5 GHz). Another alternative is to deploy APs based on LTE-A which utilize different frequency bands compared to the LTE-A system providing macro coverage.

Figure 10:
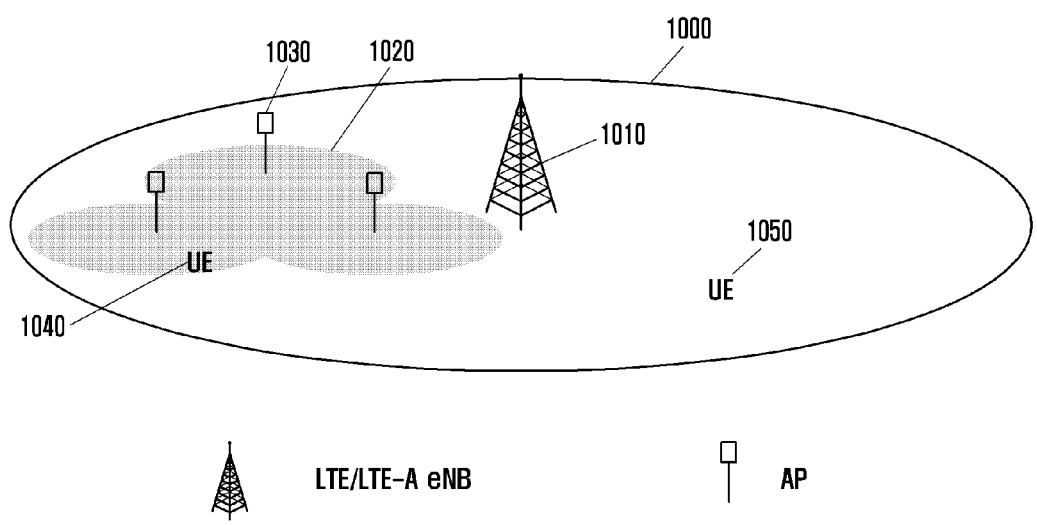
FIG. 10 illustrates the deployment of an LTE-A enhanced Node B (eNB) and such Access Point (AP) transceivers within the coverage area of the LTE-A eNB that provide macro coverage according to an exemplary embodiment of the present invention.

FIG. 10 illustrates the deployment of an LTE-A eNB and such AP transceivers within the coverage area of the LTE-A eNB that provide macro coverage according to an exemplary embodiment of the present invention.

Referring to FIG. 10, in addition to the LTE-A eNB 1010, one or more APs 1030 can be deployed within the coverage area 1000 of the LTE-A eNB 1010. Typically, while the LTE-A eNB 1010 would provide service to a UE 1050 located within the coverage area 1000 of the LTE-A eNB, these APs 1030 would provide service to a UE 1040 that is located in an area of high traffic demand 1020 in order to offload traffic from the LTE-A eNB. 1010 The APs 1030 would utilize frequency resources which are different from those of the LTE-A eNB 1010. For example, LTE-A eNB 1010 may utilize frequency resources having a system bandwidth of 20 MHz on a carrier frequency of 2 GHz while the APs 1030 in FIG. 10 may utilize frequency resources having a system bandwidth of 100 MHz on a carrier frequency of 30 GHz.

Figure 11:
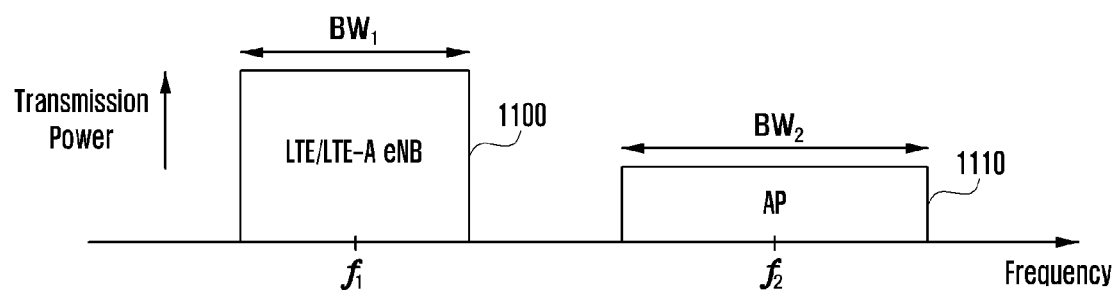
FIG. 11 illustrates an LTE-A eNB and APs utilizing different frequency resources according to an exemplary embodiment of the present invention.

FIG. 11 illustrates an LTE-A eNB and APs utilizing different frequency resources according to an exemplary embodiment of the present invention.

Referring to FIG. 11, the signal transmitted by the LTE-A eNB 1100 and the signal transmitted by the AP 1110 are different in terms of the transmission power, the carrier frequency, and the bandwidth.

Offloading the LTE-A's traffic onto the APs would allow the UEs (ex. 1040 of FIG. 10) near APs to experience a better wireless experience by utilizing the AP's wireless resources while allowing more of the LTE-A eNB's wireless resources to be diverted to UEs (ex. 1050 of FIG. 10) which are not near the APs.

In addition to offloading, carrier aggregation can also be used such that a UE receives and/or transmits data on both the LTE-A and AP's frequency resources. Utilizing both the LTE-A eNB's and the AP's frequency resources using the carrier aggregation approach would allow the UE to access higher data rates since the total bandwidth is larger than compared to using only one of either the LTE-A eNB's frequency resource or the AP's frequency resource.

While there are benefits of offloading the LTE-A eNB's traffic to APs and simultaneously using both the LTE-A eNB's frequency resources and APs' frequency resources, there is a difficulty in doing either. One notable difficulty for the UE is the detection of whether an AP is nearby or not.

Unlike an LTE-A system where system wide coverage is provided, APs may provide coverage only for traffic hot spots as shown by area 1020 in FIG. 10. Therefore, in order to determine whether or not to offload a UE to an AP requires detection of APs in the UE's proximity. In other words, a UE needs to determine whether there are APs nearby its location.

The existing method of detecting an AP is to turn on the UE's RF and baseband circuitry for the frequency band used by the AP to determine the existence of the AP. The UE would determine the existence of nearby APs by measuring the strength of the signals received on the frequency bands used by the APs. For example, a UE which is connected to an LTE-A eNB using a carrier frequency of 2 GHz would need to additionally turn on its RF and baseband circuitry to receive signals from an AP on a carrier frequency of 10 GHz.

Although such an approach could allow the UE to successfully detect nearby APs, it would mean that the UE would need to turn on its RF and baseband circuitry even when there are no APs nearby. Turning on a UE's RF and baseband circuitry in order to receive signals on the frequency bands used by the APs therefore causes additional battery power consumption which is undesirable.

As discussed above, offloading LTE-A eNB's traffic to APs or using both LTE-A frequency resources and AP's frequency resources of FIG. 11 is problematic in that a UE would need to detect the existence of APs as an initial step. The downfall of the existing method of detecting such an AP operating in a separate frequency resource as in FIG. 11 is that a UE needs to turn on its RF and baseband circuitry for the frequency band used by the AP to determine the existence of the AP, requiring additional battery power consumption.

In order to address the aforementioned problem, exemplary embodiments of the present invention allows a UE to detect APs without turning on its RF and baseband circuitry by transmitting signals on a frequency band used by the LTE-A eNB. Hereinafter, a signal transmitted from the AP on the same frequency band as that of the LTE-A eNB in order for the UE to detect the AP will be referred to as a broadcasting signal. Also, transmitting a broadcasting signal corresponds to broadcasting a broadcasting signal without specifying a UE to receive the signal.

A broadcasting signal has the following characteristics:

A broadcasting signal is transmitted by APs. An AP is characterized as a device providing a wireless connection to terminals on either the same frequency band as or a frequency band other than that used by the LTE-A eNB which provides system-wide coverage.

A broadcasting signal is transmitted on the same frequency band as that of the LTE-A eNB which provides system-wide coverage.

A broadcasting signal is transmitted in compliance with the LTE-A radio access technology such that it can coexist with the LTE-A data transmission from the LTE-A eNB. In short, a broadcasting signal can be transmitted from the AP without causing interference or receiving interference to and from the LTE-A data transmission from an LTE-A eNB. More specifically, a broadcasting signal is transmitted to occupy a subset of REs which are used to transmit a CSI-RS.

The role of a broadcasting signal is to provide a UE with means to determine how close it is to the AP. The key feature of a broadcasting signal is that it is transmitted not on the frequency band that the AP utilizes for data transmission but the frequency band utilized by the LTE-A eNB. Transmitting a broadcasting signal on the frequency band utilized by the LTE-A eNB allows the UE to determine how close it is to the AP without turning on the RF circuitry and the baseband circuitry for the frequency band used for AP's data transmission. Therefore, the detection of an AP can be done with only the RF and baseband circuitry turned on for the frequency band used for the LTE-A eNB's data transmission.

The determination by a UE of how close it is to an AP can be achieved by measuring the received signal strength of a broadcasting signal and comparing that to the transmission power of the broadcasting signal. Based on the measurement and the transmission power, the UE can determine a path loss between itself and the AP transmitting the broadcasting signal. Theoretically, a path loss is between two points is modeled as a function of the carrier frequency and distance between the two points. Therefore, based on the carrier frequency of a broadcasting signal and a path loss, a UE can determine the distance between the AP and itself.

Figure 12:
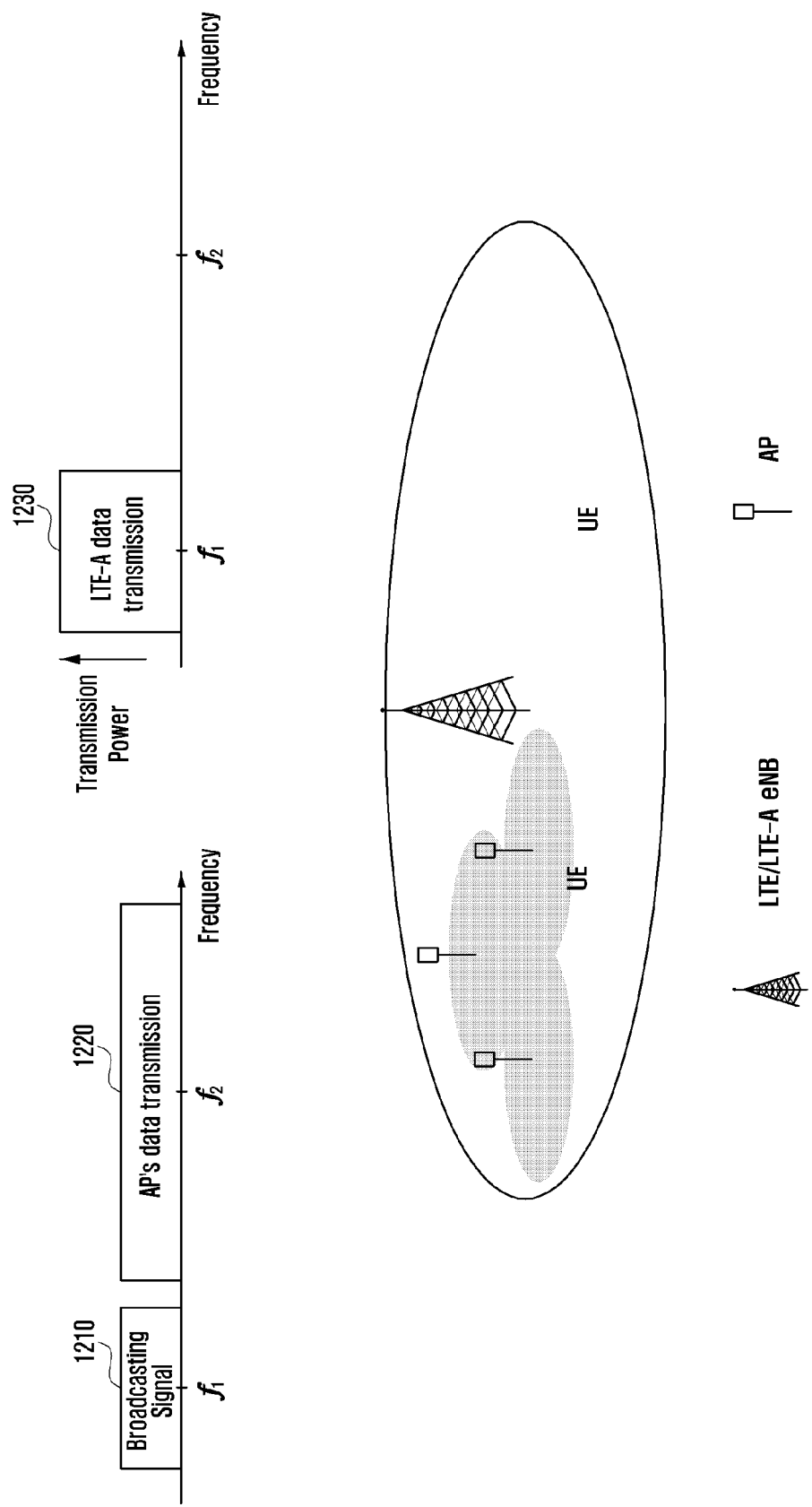
FIG. 12 illustrates the transmission of a broadcasting signal from an AP on the same carrier frequency as that of an LTE-A transmission from an LTE-A eNB according to an exemplary embodiment of the present invention.

FIG. 12 illustrates the transmission of a broadcasting signal from an AP on the same carrier frequency as that of an LTE-A transmission from an LTE-A eNB according to an exemplary embodiment of the present invention.

Referring to FIG. 12, it can be observed that the AP transmits a broadcasting signal 1210 and a data signal 1220. Notably, the AP broadcasting signal 1210 is on the same frequency band f1 that the signal 1230 that the LTE-A eNB is transmitting its data on.

Figure 13:
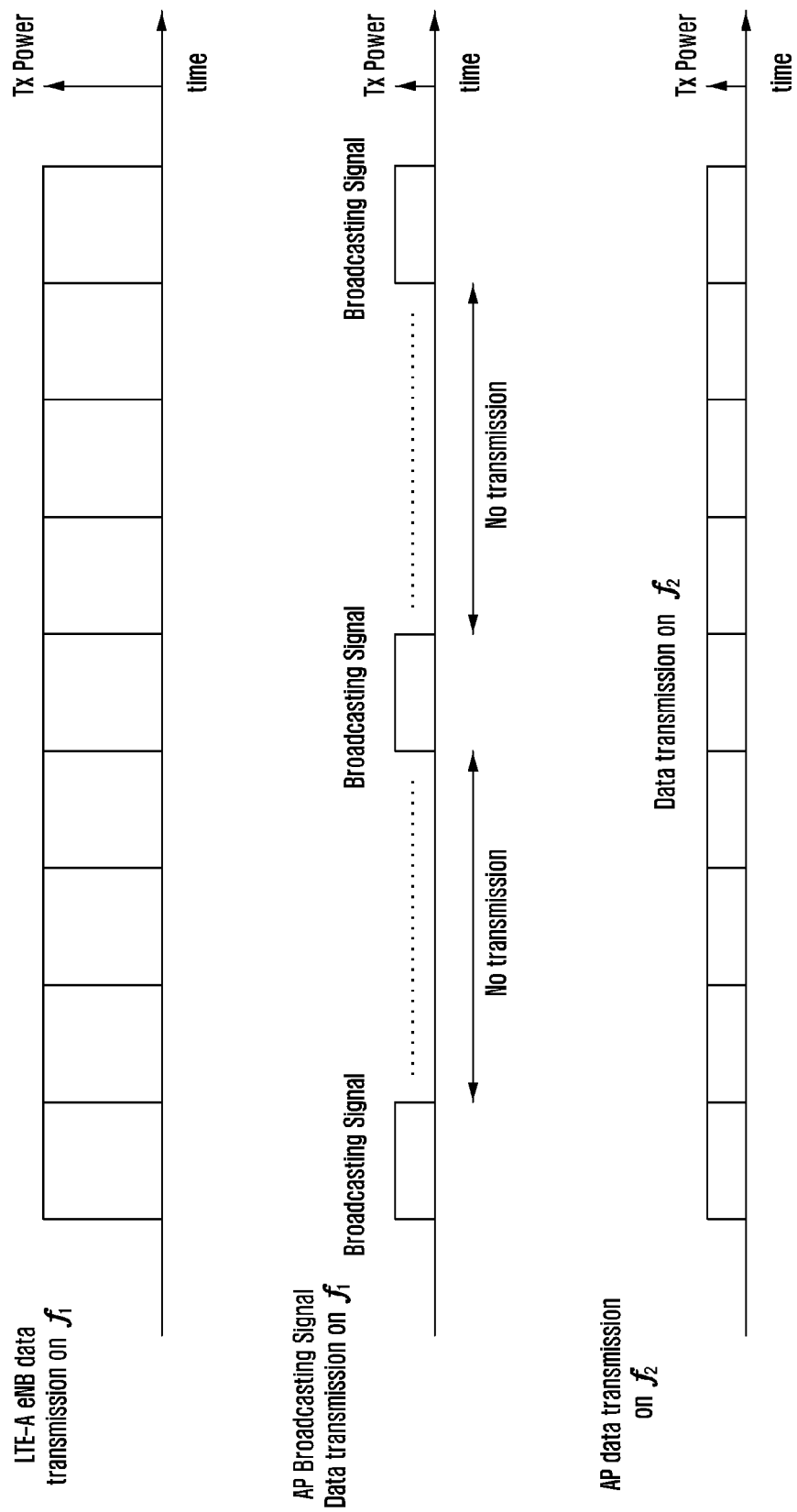
FIG. 13 illustrates how a broadcasting signal is transmitted on the time domain according to an exemplary embodiment of the present invention.

FIG. 13 depicts how a broadcasting signal is transmitted on the time domain according to an exemplary embodiment of the present invention.

Referring to FIG. 13, while the LTE-A eNB's data transmission on carrier frequency f1 may occur on every subframe, the AP's broadcasting signal transmission on carrier frequency f1 may only occur in a subset of the time resources. Transmitting on a subset of the time resources allows more resources to be available for LTE-A eNB's data transmission. Additionally, the data transmission by the AP on carrier frequency f2 may occur on every subframe.

Figure 14:
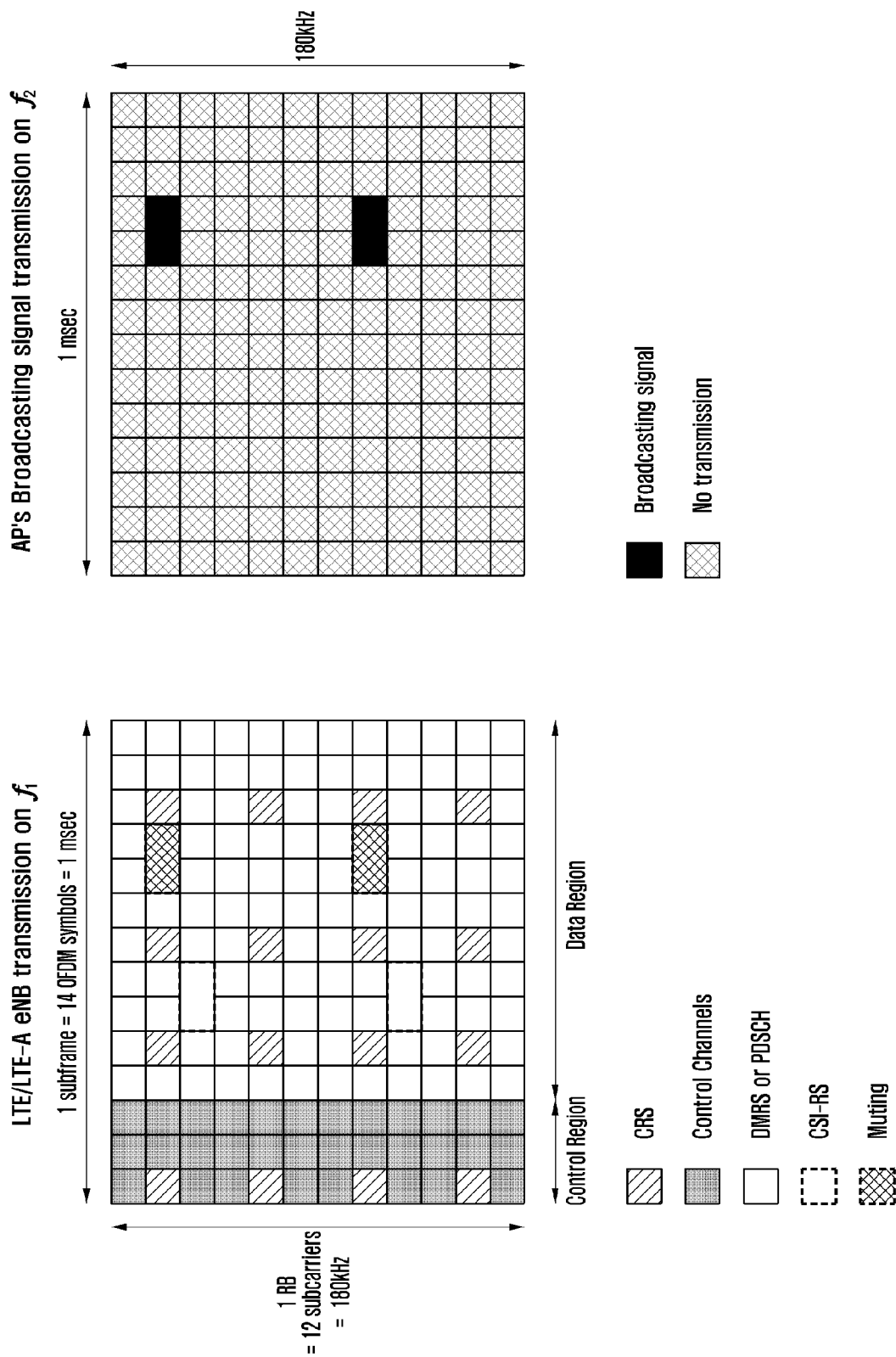
FIG. 14 illustrates how a broadcasting signal is transmitted on the frequency domain according to an exemplary embodiment of the present invention.

FIG. 14 illustrates how a broadcasting signal is transmitted on the frequency domain according to an exemplary embodiment of the present invention.

Referring to FIG. 14, both a broadcasting signal from the AP and the data transmission from the LTE-A eNB are made on the same carrier frequency of f1.

In an exemplary implementation, the AP transmits a broadcasting signal to be in the same resources as an LTE-A CSI-RS. Accordingly, the LTE-A eNB can apply muting or zero-power CSI-RS on the resources used by the AP to transmit a broadcasting signal as shown in FIG. 14. Such an approach would allow the UEs to receive a broadcasting signal without interference from the LTE-A eNB. Additionally, such an approach would allow the UEs receiving data from the LTE-A eNB to avoid interference from a broadcasting signal transmitted by the AP.

In order to transmit a broadcasting signal as shown in FIGS. 13 and 14, it is important that the AP has time and frequency synchronization with the LTE-A eNB. Time and frequency synchronization with the LTE-A eNB can be achieved in one of multiple ways.

In one exemplary method, both the LTE-A eNB and the AP can share a common time and frequency reference. For example, a Global Positioning System (GPS) signal can be a good time reference. In another exemplary method, the AP can synchronize to the LTE-A eNB by receiving the CRS transmitted by the LTE-A eNB. The CRS from the LTE-A eNB can act as a reference for both time and frequency synchronization. The AP can receive the CRS transmitted from the LTE-A eNB in the subframes where it is not transmitting the broadcasting signal. Such time periods where broadcasting signals are not being transmitted can be observed in FIG. 13.

It is noted that a broadcasting signal does not have to be transmitted on the same bandwidth as the CSI-RS from the LTE-A eNB. The role of the LTE-A CSI-RS transmission is to allow the UE to measure the small scale variation of the wireless channel in detail. In order to do so, the UE needs to CSI-RS to be spread out on the system bandwidth. On the other hand, the role of a broadcasting signal is to allow the UE to determine a path loss from the AP to the UE. It is not necessary for a broadcasting signal to be spread out on the system bandwidth to achieve this. In fact, it is possible to achieve this even if a broadcasting signal occupies a fraction of the system bandwidth.

Figure 15:
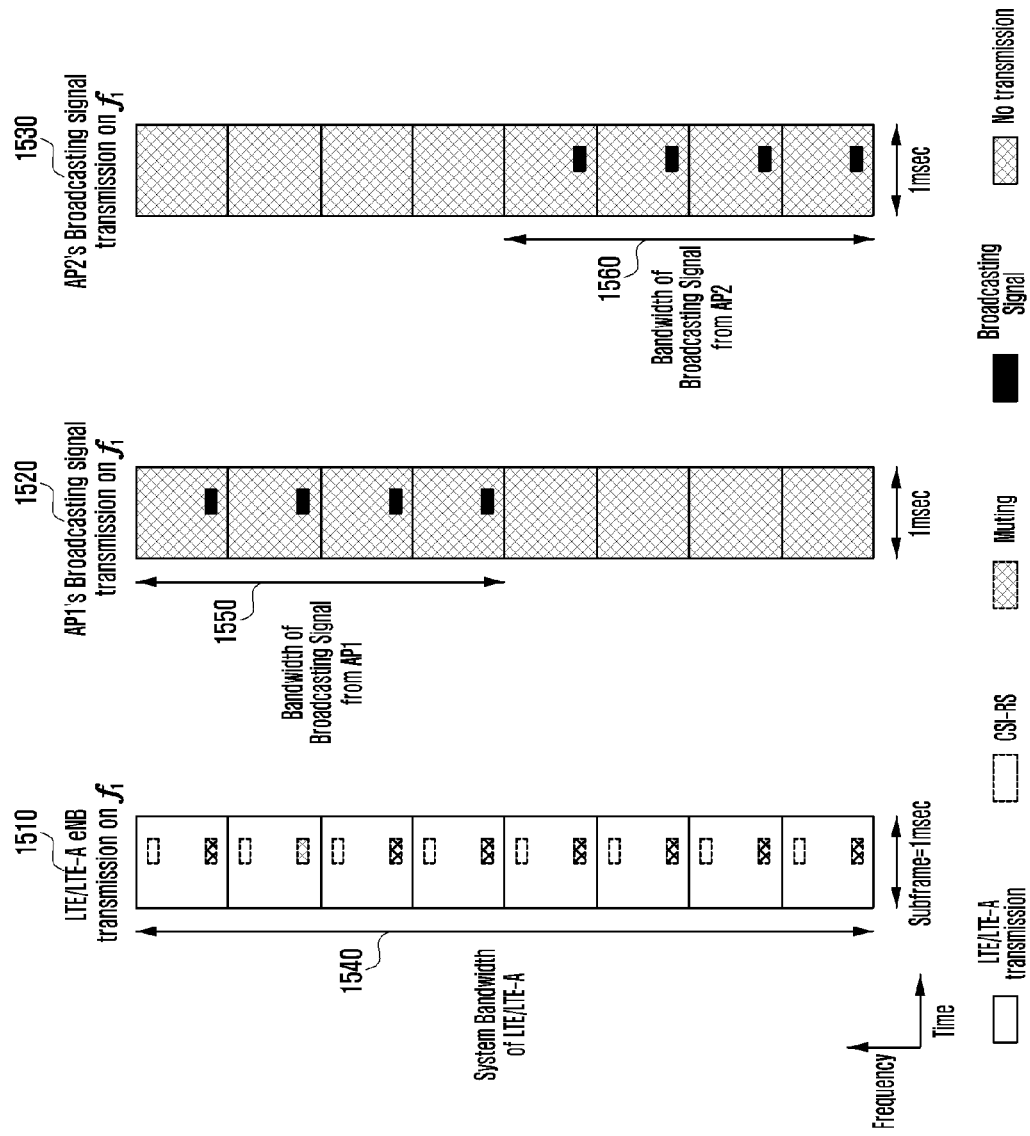
FIG. 15 illustrates an example of a broadcasting signal being transmitted while occupying a fraction of the system bandwidth according to an exemplary embodiment of the present invention.

FIG. 15 illustrates an example of a broadcasting signal being transmitted while occupying a fraction of the system bandwidth according to an exemplary embodiment of the present invention.

Referring to FIG. 15, all of data transmission 1510 from the LTE-A eNB, broadcasting signal transmission 1520 from AP1, and broadcasting signal transmission 1530 from AP2 are performed on the carrier frequency fl. Additionally, it can be observed that a broadcasting signal from AP 1 is transmitted only on a bandwidth 1550 that is half of the LTE-A eNB's system bandwidth 1540. Therefore, a broadcasting signal from AP2 can be transmitted on a bandwidth 1560 that is the other half of the system bandwidth 1540. As a result, broadcasting signals from multiple APs can be transmitted utilizing resources for a single CSI-RS.

Meanwhile, in order for an AP to transmit a broadcasting signal, it is necessary for the AP to be allocated resources for its broadcasting signal transmission. Therefore, a procedure for an AP identifying itself and being assigned the necessary resources for broadcasting signal transmission is necessary.

Figure 16:
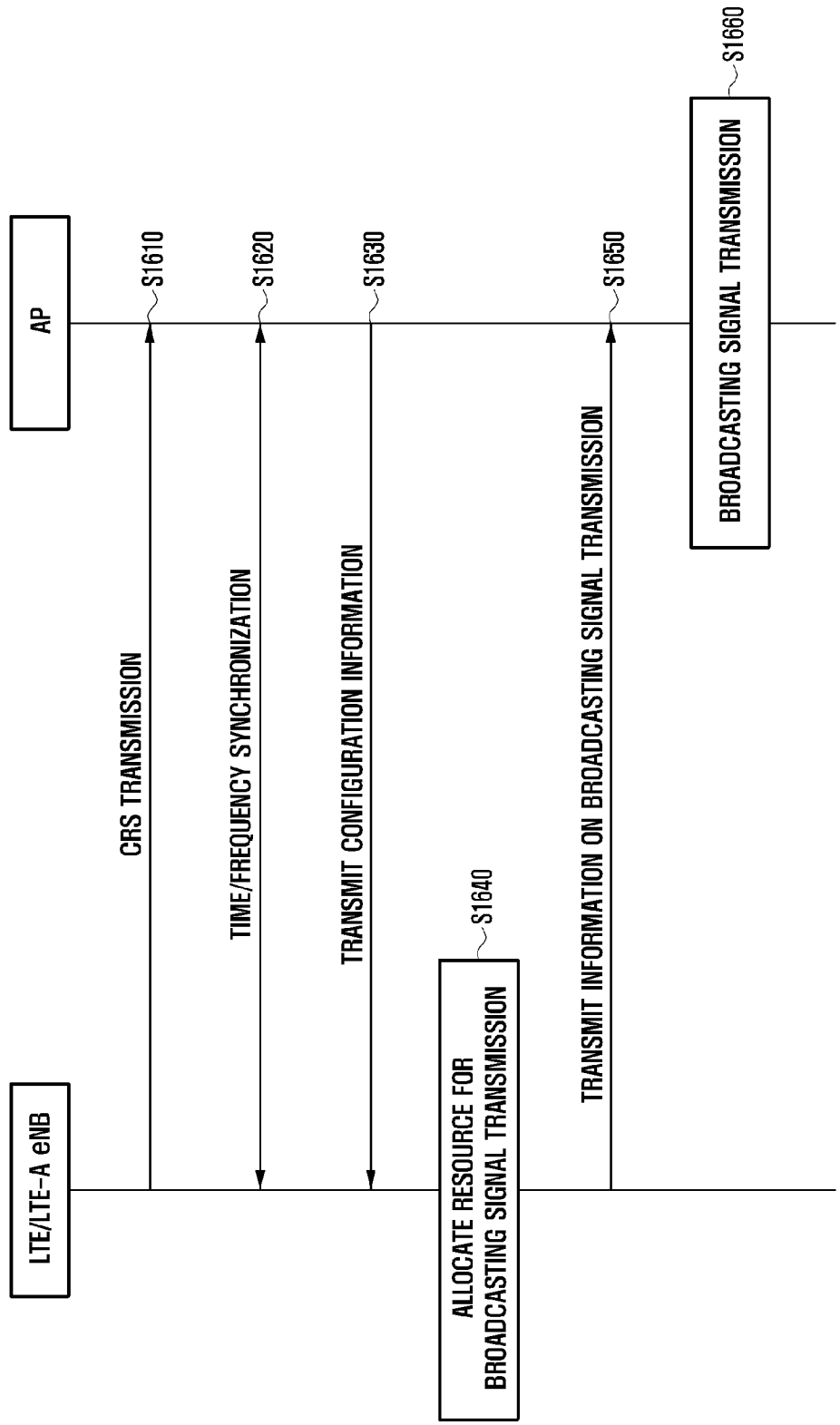
FIG. 16 illustrates a procedure in which an AP supporting broadcasting signal transmission is assigned resources from an LTE-A eNB according to an exemplary embodiment of the present invention.

FIG. 16 illustrates a procedure in which an AP supporting broadcasting signal transmission is assigned resources from an LTE-A eNB according to an exemplary embodiment of the present invention. The exemplary procedure shown in FIG. 16 assumes that the resource assignment for the broadcasting signal transmission is done using the LTE-A wireless link between the LTE-A and AP.

Referring to FIG. 16, in step S1610, the AP acquires the CRS transmitted from the LTE-A eNB. Therefore, in step S1620, time and frequency synchronization is achieved between the AP and the LTE-A eNB.

In step S1630, the AP performs a network entry procedure. As part of the network entry procedure, the AP identifies itself and conveys one or more of the following configuration information to the LTE-A eNB:

Information that the AP is capable of transmitting a broadcasting signal
Information on the parameters related to the transmission of a broadcasting signal (time periodicity, transmission power, bandwidth, carrier frequency, etc.)
Information on which service operator the AP belongs to
Information on the type of radio access technology supported by the AP for data transmission (WiFi, WiGig, millimeter wave based technology, LTE-A, etc.)
Information on the transmission parameters for data transmission from the AP (carrier frequency, bandwidth, transmission power, etc.)

The AP conveys the above configuration information to the LTE-A eNB in a wireless manner either using LTE-A defined higher layer signaling or application layer defined signaling.

In step S1640, using the above configuration information, the LTE-A eNB allocates the AP to transmit a broadcasting signal on a specific set of resources which correspond to the resources for a CSI-RS transmission or subset of resources for a CSI-RS transmission. Such allocation is done in step S1650 by LTE-A sending, to the AP, broadcasting signal transmission information related to the transmission of the broadcasting signal. The broadcasting signal transmission information may include one or more of the following:

Time periodicity of the broadcasting signal transmission
Time offset for the broadcasting signal transmission
REs to use for the transmission of broadcasting signal (should belong to one or part of resources used for CSI-RS transmission)
Transmission power of the broadcasting signal
Bandwidth of the broadcasting signal transmission
Initial state for generating the scrambling sequence for the broadcasting signal
Carrier frequency for the transmission of broadcasting signal In step S1660, based on the broadcasting signal transmission information received from the LTE-A eNB, the AP transmits a broadcasting signal. As mentioned above, FIG. 16 is based on the assumption that the configuration of the broadcasting signal is done using a wireless link between the LTE-A eNB and the AP. Additionally, the same configuration can be done using an Internet Protocol (IP) based wired link. In this approach, the AP uses an IP based wired connection to identify itself and exchange the information necessary for its broadcasting signal transmission.

Meanwhile, using the broadcasting signal transmitted from an AP, a UE establishes a connection to the AP. For this, a procedure between a UE, an AP, and an LTE-A eNB is necessary.

Figure 17:
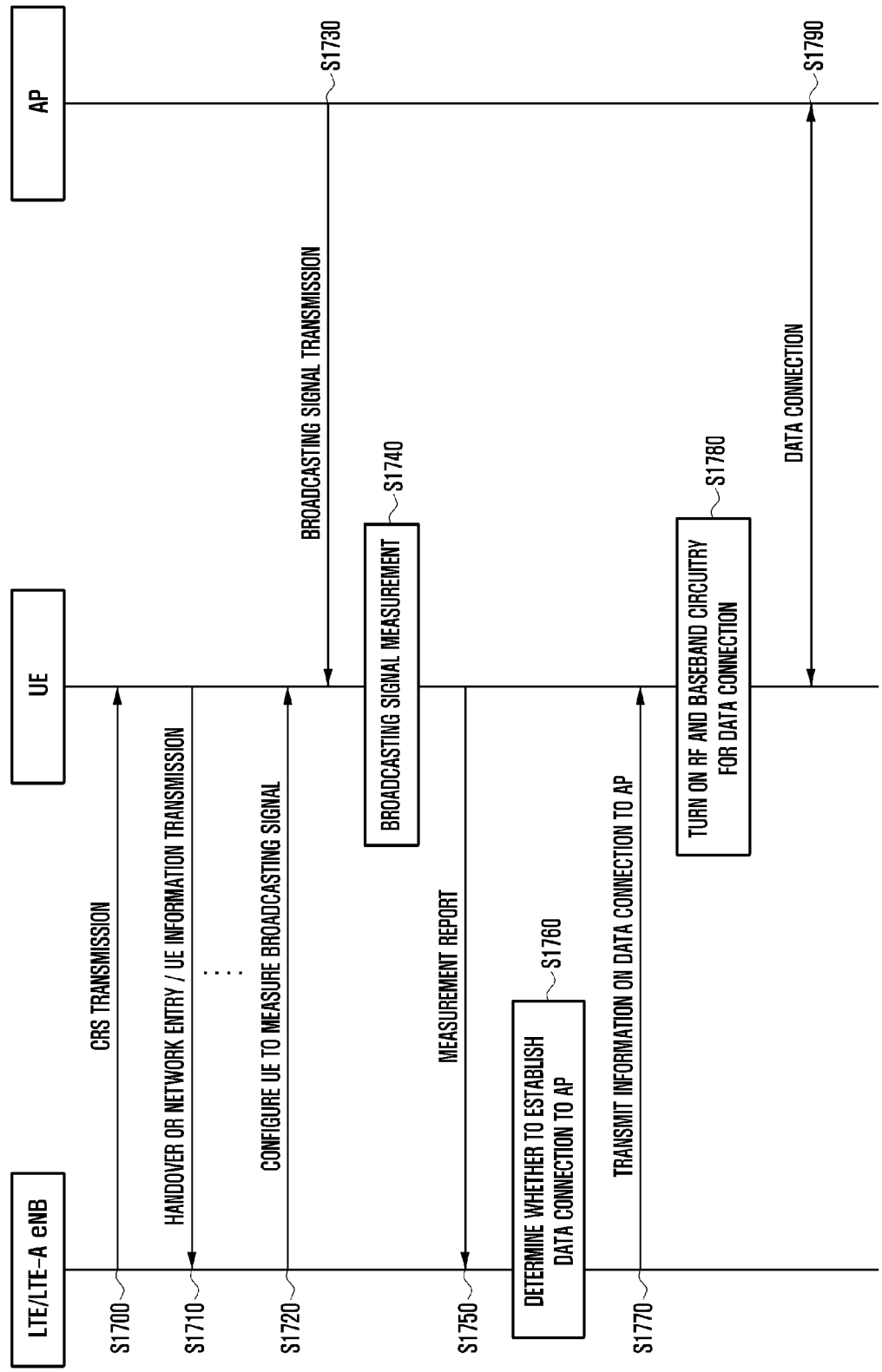
FIG. 17 illustrates a procedure in which a UE measures a broadcasting signal and establishes a data connection with an AP according to an exemplary embodiment of the present invention.

FIG. 17 illustrates a procedure in which a UE measures a broadcasting signal and establishes a data connection with an AP according to an exemplary embodiment of the present invention.

Referring to FIG. 17, the UE acquires the CRS in step S1700, and performs initial network entry or handover procedure in step S1710. Once the UE is connected to a specific cell, the UE may transmit its device capability information to the LTE-A eNB. The device capability information may include information about wireless data services (e.g., WiFi, WiGig, millimeter wave based technology, etc.) other than LTE-A supported by the UE. Based on such device capability information, the LTE-A eNB may determine whether to measure broadcasting signals of an AP that provides wireless data services supported by the UE.

In step S1720, the LTE-A eNB may configure the UE to measure broadcasting signals transmitted from the AP under its supervision. Such APs typically are located within the coverage area of the LTE-A eNB and have connection to the LTE-A eNB in a wireless or wired manner as mentioned previously.

In order to allow the UE to measure the broadcasting signal, broadcasting signal reception information including one or more of the following information may be conveyed to the UE from the LTE-A eNB using higher layer signaling.

First, information related to the data transmission from AP is as follows:
 Information that there is an AP capable of transmitting a broadcasting signal
 Information on the type of radio access technology supported by the AP for data transmission (WiFi, WiGig, millimeter wave based technology, LTE-A, etc.)
 Information on the transmission parameters for data transmission from the AP (carrier frequency, bandwidth, transmission power, etc.)

Second, information related to the broadcasting signal transmission from AP is as follows:
 Time periodicity of the broadcasting signal transmission
 Time offset for the broadcasting signal transmission
 REs to use for the transmission of the broadcasting signal
 Transmission power of the broadcasting signal
 Bandwidth of the broadcasting signal transmission
 Initial state for generating the scrambling sequence for the broadcasting signal
 Carrier frequency for the transmission of the broadcasting signal Once the UE receives the above broadcasting signal reception information from the LTE-A eNB, the UE can identify and measure a broadcasting signal transmitted from an AP. Transmission of the broadcasting signal by the AP in step S1730 is previously discussed in FIG. 16.

The UE receives and measures a broadcasting signal in step S1740, and reports measurement results of the broadcasting signal to the LTE-A eNB in step S1750. The measurement report can be one or more of the following:
 Path loss from the AP to the UE
 Received signal strength of the broadcasting signal
 Distance from the AP to the UE
 Signal to Noise and Interference Ratio (SNIR) of the broadcasting signal All of the above can be used as a factor in determining whether or not the UE should establish a data connection to an AP. Additionally, the measurement report can be of another form but derived from the received broadcasting signal. The measurement report from the UE may include measurements from multiple broadcasting signals. Such a report would allow the LTE-A eNB to decide not only to establish a data connection between a UE and an AP but also determine which AP is the best candidate to do so. In step S1760, the LTE-A eNB determines whether to establish a data connection between the UE and the AP.

If the LTE-A decides to establish a data connection between the UE and the AP, it informs the UE to turn on its RF and baseband circuitry for data communication with the AP in step S1770. In doing so, the LTE-A eNB may convey connection information including one or more of the following:
 Information related to identifying the AP with which to establish data connection
 Information on the type of radio access technology supported by the AP for data transmission (WiFi, WiGig, millimeter wave based technology, LTE-A, etc.)
 Information on the transmission parameters for data transmission from the AP (carrier frequency, bandwidth, transmission power, etc.)

Basically, the above information can be used by the UE to identify with which AP to establish data connection, which radio technology to use, and how to configure its RF circuitry for tuning in to the AP's data signal. Having received the above information, the UE turns on its RF and baseband circuitry for data connection to the AP in step S1780. In step S1790, the UE establishes a data connection to the AP and starts data communication with the AP.

Meanwhile, in step S1740 of FIG. 17, the UE makes measurement reports to the LTE-A eNB based on the received broadcasting signal from the AP. The measurement can be made to be periodic in which case a measurement report from the UE is conveyed to the eNB using higher layer signaling every N subframes. Alternatively, the measurement report can be event-triggered in which case a measurement report from the UE is conveyed to the eNB using higher layer signaling if a predefined event occurs. The aforementioned predefined event can be when the measurement crosses a certain threshold value. This threshold value can be set individually per broadcasting signal in a UE specific manner using higher layer signaling.

Figure 18:
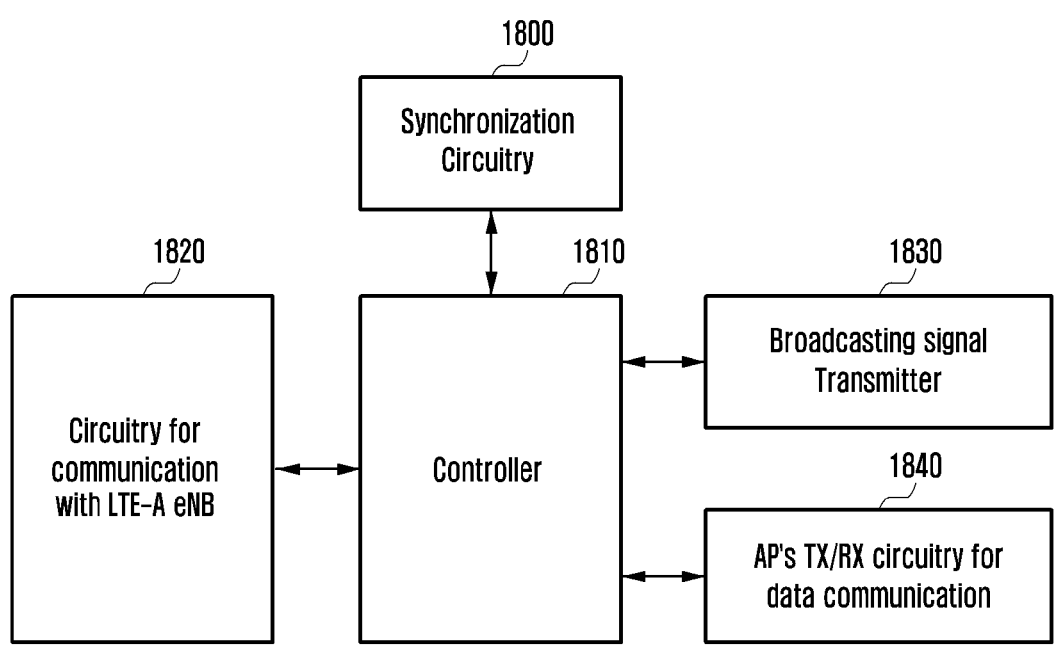
FIG. 18 illustrates a block diagram of a broadcasting signal transmission apparatus according to an exemplary embodiment of the present invention.

FIG. 18 illustrates a block diagram of a broadcasting signal transmission apparatus according to an exemplary embodiment of the present invention.

Referring to FIG. 18, the broadcasting signal transmission apparatus may be formed as an AP and therefore can perform the above-discussed process of broadcasting signal transmission by the AP. The broadcasting signal transmission apparatus includes a synchronization unit 1800, a controller 1810, an LTE-A eNB TX/RX unit 1820, a broadcasting signal transmitter 1830, and a UE TX/RX unit 1840.

The synchronization unit 1800 is used by the AP to acquire the CRS transmitted from the LTE-A eNB and to achieve time and frequency synchronization with reference to the received CRS from the LTE-A eNB. The LTE-A eNB TX/RX unit 1820 is used by the AP to exchange information necessary in transmitting the broadcasting signal with the LTE-A eNB. Most notably, the AP identifies itself and receives the assignment on how the broadcasting signal should be transmitted using this LTE-A eNB TX/RX unit 1820. Also, the LTE-A eNB TX/RX unit 1820 may either operate wirelessly using LTE-A technology or in a wired manner using an IP connection.

Based on the broadcasting signal transmission information conveyed from the LTE-A eNB, the AP transmits the broadcasting signal using the broadcasting signal transmitter 1830. Additionally, the AP uses the UE TX/RX unit 1840 for providing data communication to UEs. The above operation is controlled by the controller 1810.

Figure 19:
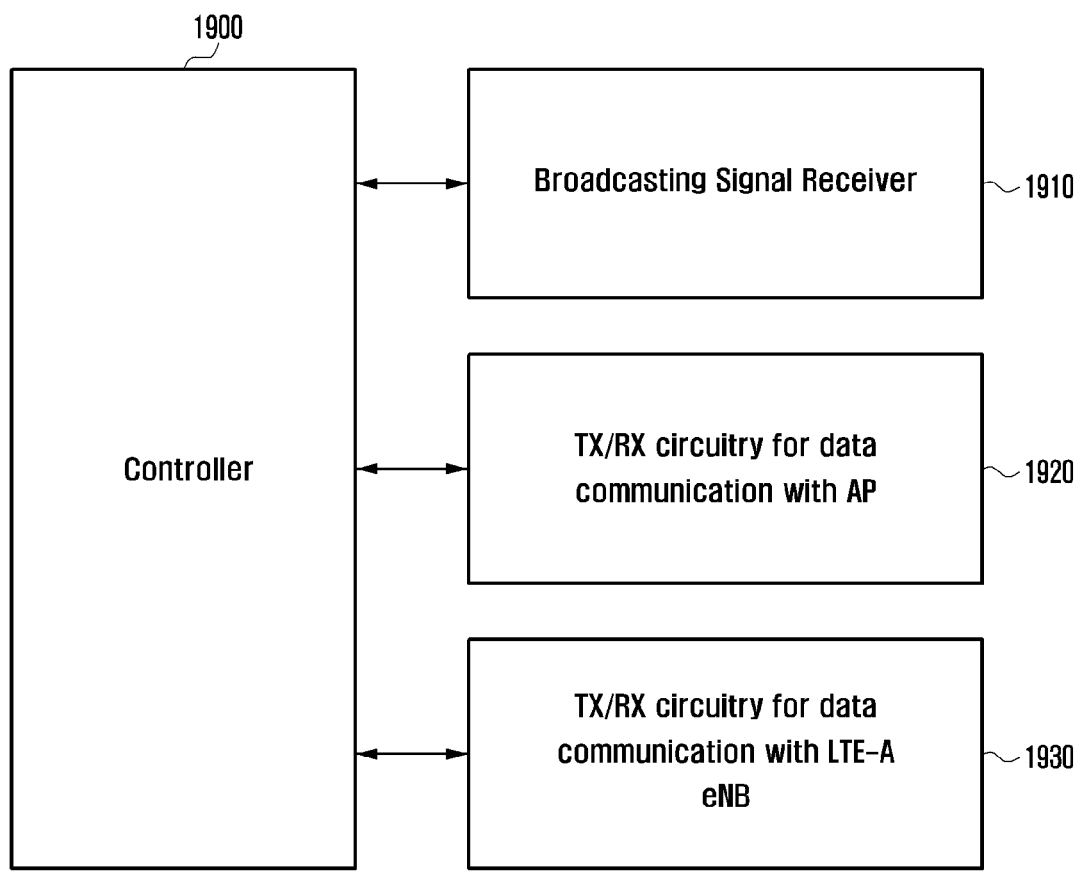
FIG. 19 illustrates a block diagram of a broadcasting signal reception apparatus according to an exemplary embodiment of the present invention.

FIG. 19 illustrates a block diagram of a broadcasting signal reception apparatus according to an exemplary embodiment of the present invention.

Referring to FIG. 19, the broadcasting signal reception apparatus may be formed as a UE and therefore can perform the above-discussed UE operations. The broadcasting signal reception apparatus includes a controller 1900, a broadcasting signal receiver 1910, an AP TX/RX unit 1920, and an LTE-A eNB TX/RX unit 1930.

The UE receives information related to broadcasting signal reception using the LTE-A eNB TX/RX unit 1930 for data communication with the LTE-A eNB. Once the UE receives, from the LTE-A eNB, necessary information to receive the broadcasting signals from APs, it uses the broadcasting signal receiver 1910 to receive the broadcasting signal.

A measurement report obtained through the measurement of broadcasting signals is conveyed to the LTE-A eNB using the LTE-A eNB TX/RX unit 1930. Additionally, the UE may receive indication and connection information from the LTE-A eNB on whether to turn on the AP TX/RX unit 1920. The above operation is controlled by the controller 1900.

Figure 20:
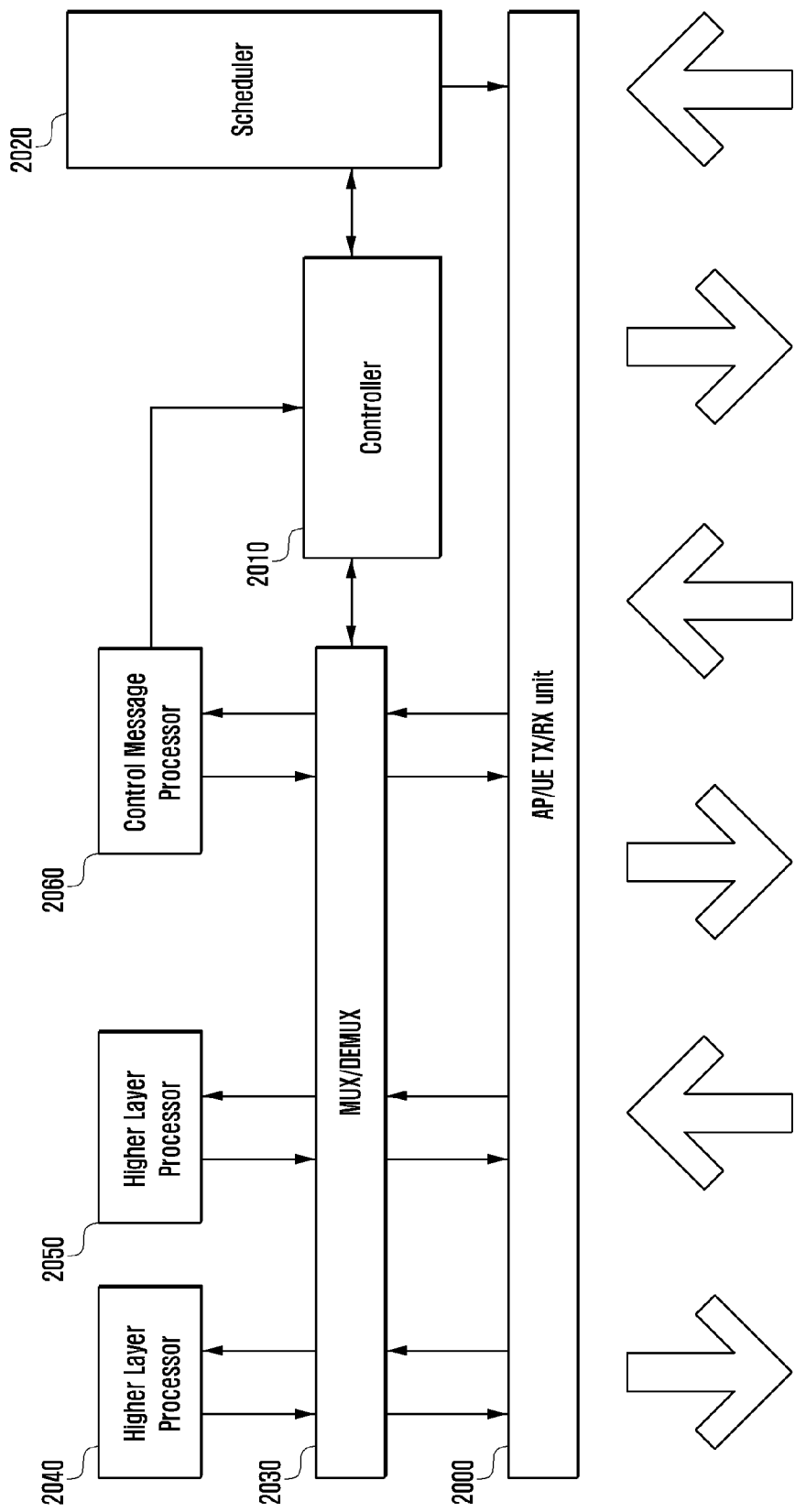
FIG. 20 illustrates a block diagram of a broadcasting signal control apparatus according to an exemplary embodiment of the present invention.

FIG. 20 illustrates a block diagram of a broadcasting signal control apparatus according to an exemplary embodiment of the present invention.

Referring to FIG. 20, the broadcasting signal control apparatus may be formed as a base station, i.e., an LTE-A eNB, and therefore can perform the above-discussed operations of the LTE-A eNB. The broadcasting signal control apparatus includes an AP/UE TX/RX unit 2000, a controller 2010, a scheduler 2020, a MUX/DEMUX 2030, higher layer processors 2040 and 2050, and a control message processor 2060.

The AP/UE TX/RX unit 2000 may be composed of an AP TX/RX unit that transmits or receives signals and data to or from an AP, and a UE TX/RX unit that transmits or receives signals and data to or from a UE. Specifically, the AP TX/RX unit receives configuration information from the AP and transmits broadcasting signal transmission information to the AP under the control of the controller 2010. Also, the UE TX/RX unit transmits broadcasting signal reception information to the UE, based on device capability information received from the UE, receives broadcasting signal measurement report of the UE, and transmits connection information for establishing a data connection with the AP.

The MUX/DEMUX 2030 multiplexes the data created by the higher layer processors 2040 and 2050 or the control message processor 2060 or demultiplexes the data received by the AP/UE TX/RX unit 2000, and delivers such multiplexed or demultiplexed data to the higher layer processors 2040 and 2050, the control message processor 2060, or the controller 2010.

The controller 2010 performs the above-discussed operations, namely, a process of configuring the transmission of broadcasting signals by the AP and a process of configuring the reception and measurement of broadcasting signals by the UE. The control message processor 2060 creates and processes a message containing information to be delivered to the AP or the UE upon instructions of the controller 2010.

The higher layer processors 2040 and 2050 may be formed according to devices and services. The higher layer processors 2040 and 2050 process data created in user services such as File Transfer Protocol (FTP) or Voice over Internet Protocol (VoIP) and delivers them to the MUX/DEMUX 2030, or processes data received from the MUX/DEMUX 2030 and delivers them to service applications on an upper layer.

The scheduler 2020 allocates resources to the UE and the AP at a proper time in consideration of buffer states, channel conditions, active time, and the like. Also, the scheduler 2020 processes signals transmitted by the UE and the AP or processes the UE and the AP to transmit signals.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a broadcasting signal by an Access Point (AP) located within a coverage area of a base station (eNB), the method comprising:
    transmitting configuration information to the eNB, the configuration information being used for transmission of the broadcasting signal;
    receiving broadcasting signal transmission information from the eNB, the broadcasting signal transmission information being based on the configuration information and indicating a set of resource elements at which muting is applied by the eNB;
    transmitting the broadcasting signal according to the broadcasting signal transmission information using the set of resource elements of a first frequency band, the first frequency band being used for communication between a user equipment (UE) and the eNB; and
    establishing a data transmission/reception connection on a second frequency band with the UE,
    wherein the UE is configured to determine a path loss between the UE and the AP based on the broadcasting signal and receive an indication identifying the AP,
    wherein the data transmission/reception connection is established between the UE and the AP on the second frequency band based on the determined path loss, and
    wherein the second frequency band is mutually exclusive from the first frequency band.

2. The method of claim 1, further comprising:
    transmitting and receiving data to and from the UE through the data transmission/reception connection.

3. The method of claim 1, wherein the broadcasting signal is transmitted using resources allocated for a Channel Status Information Reference Signal (CSI-RS) to be transmitted by the eNB.

4. The method of claim 1, wherein the first frequency band corresponds to a part of a system bandwidth of the eNB.

5. The method of claim 1,
    wherein the configuration information includes at least one of information about whether broadcasting signal transmission is possible, parameter information related to the broadcasting signal transmission, information on a radio access technology supported by the AP, and parameter information related to data transmission, and
    wherein the broadcasting signal transmission information includes at least one of information related to time and frequency for the broadcasting signal transmission, information about resources allocated for the broadcasting signal transmission, and initial state information for generating a scrambling sequence for the broadcasting signal.

6. A method for receiving a broadcasting signal from an Access Point (AP) located within a coverage area of a base station (eNB) by a User Equipment (UE), the method comprising:
    transmitting device capability information to the eNB;
    receiving broadcasting signal reception information from the eNB, the broadcasting signal reception information being used to receive the broadcasting signal of the AP;
    receiving an indication identifying the AP from the eNB;
    receiving and measuring the broadcasting signal transmitted from the AP on a first frequency band using a set of resource elements at which muting is applied by the eNB, the set of resource elements indicated in the broadcasting signal reception information;
    determining a path loss between the UE and the AP based on the broadcasting signal;
    transmitting a measurement report of the broadcasting signal to the eNB;
    receiving connection information from the eNB including an indication identifying the AP; and
    establishing a data transmission/reception connection on a second frequency band with the AP based on the connection information and the determined path loss,
    wherein the second frequency band is mutually exclusive from the first frequency band, and wherein the first frequency band is used for communication between the UE and the eNB.

7. The method of claim 6, further comprising:
receiving and transmitting data from and to the AP through the data transmission/reception connection.

8. The method of claim 6, wherein the connection information includes at least one of identification information of the AP with which the data transmission/reception connection will be established, information on a radio access technology supported by the AP, and transmission parameter information for data transmission from the AP.

9. The method of claim 6, wherein the broadcasting signal is received using resources allocated for a Channel Status Information Reference Signal (CSI-RS) to be transmitted by the eNB.

10. The method of claim 6, wherein the broadcasting signal is received on a frequency band which corresponds to a part of a system bandwidth of the eNB.

11. The method of claim 6, wherein the device capability information includes information on a radio access technology supported by the UE.

12. The method of claim 6,
wherein the broadcasting signal reception information includes at least one of information about whether the AP can transmit the broadcasting signal, parameter information related to the broadcasting signal transmission, information on a radio access technology supported by the AP, and parameter information related to data transmission of the AP, and
wherein the measurement report of the broadcasting signal includes at least one of a path loss from the AP to the UE, a received signal strength of the broadcasting signal, a distance between the AP and the UE, and information on Signal to Noise and Interference Ratio (SNIR) of the broadcasting signal.

13. A method for controlling a broadcasting signal transmission of an Access Point (AP) located within a coverage area of a base station (eNB), the method comprising:
receiving configuration information from the AP, the configuration information being used for the broadcasting signal transmission;
transmitting broadcasting signal transmission information to the AP, the broadcasting signal transmission information indicating a set of resource elements at which muting is applied by the eNB, wherein the broadcasting signal transmission information being used by the AP to transmit a broadcasting signal on a first frequency band using the set of resource elements;
generating broadcasting signal reception information used for a user equipment (UE) to receive the broadcasting signal from the AP based on device capability information received from the UE;
transmitting the broadcasting signal reception information to the UE;
receiving a measurement report of the broadcasting signal from the UE;
determining to establish a data transmission/reception connection on a second frequency band between the UE and the AP based on the measurement report; and
transmitting connection information to the UE,
wherein the UE is configured to determine a path loss between the UE and the AP based on the broadcasting signal transmitted on the first frequency band and receive an indication identifying the AP,
wherein the data transmission/reception connection is established on the second frequency band between the UE and the AP based on the connection information and the determined path loss,
wherein the second frequency band is mutually exclusive from the first frequency band, and
wherein the first frequency band is used for communication between the UE and the eNB.

14. The method of claim 13, wherein the measurement report is for broadcasting signals of a plurality of APs, and wherein the connection information is for the best AP determined among the plurality of APs.

15. The method of claim 13,
wherein the broadcasting signal transmission information includes information for allocating a part of resources to the broadcasting signal transmission of the AP, the resources being allocated for a Channel Status Information Reference Signal (CSI-RS) to be transmitted by the eNB.

16. The method of claim 13,
wherein the broadcasting signal transmission information includes bandwidth information of the broadcasting signal transmission, and
wherein the bandwidth information corresponds to a part of a system bandwidth of the eNB.

17. An access point (AP) for transmitting a broadcasting signal within a coverage area of a base station (eNB), the apparatus comprising:
an eNB TX/RX unit configured to:
transmit configuration information to the eNB, the configuration information being used for transmission of the broadcasting signal on a first frequency band, and
receive broadcasting signal transmission information from the eNB, the broadcasting signal transmission information being based on the configuration information and indicating a set of resource elements at which muting is applied by the eNB;
a broadcasting signal transmitter configured to transmit the broadcasting signal according to the broadcasting signal transmission information using the set of resource elements of the first frequency band; and
a user equipment (UE) TX/RX unit configured to establish a data transmission/reception connection with a UE on a second frequency band,
wherein the UE is configured to determine a path loss between the UE and the AP based on the broadcasting signal and receive an indication identifying the AP,
wherein the data transmission/reception connection is established between the UE and the AP on the second frequency band based on the determined path loss,
wherein the first frequency band is used for communication between the UE and the eNB, and
wherein the second frequency band is mutually exclusive from the first frequency band.

18. The AP of claim 17, wherein the UE TX/RX unit is further configured to transmit and receive data to and from the UE through the data transmission/reception connection.

19. A user equipment (UE) for receiving a broadcasting signal from an Access Point (AP) located within a coverage area of a base station (eNB), the UE comprising:
an eNB TX/RX unit configured to:
transmit device capability information to the eNB,
receive broadcasting signal reception information from the eNB, the broadcasting signal reception information being used to receive the broadcasting signal of the AP, and receive an indication identifying the AP from the eNB;

a broadcasting signal receiver configured to receive the broadcasting signal transmitted from the AP on a first frequency band using a set of resource elements at which muting is applied by the eNB, the set of resource elements indicated in the broadcasting signal reception information;

an access point (AP) TX/RX unit configured to establish a data transmission/reception connection on a second frequency band based on connection information received from the eNB; and a controller configured to:

measure the received broadcasting signal, determine a path loss between the UE and the AP based on the broadcasting signal, and transmit a measurement report of the broadcasting signal to the eNB, receive connection information including identification information of the AP and wherein the data transmission/reception connection is established between the UE and the AP on the second frequency band based on the determined path loss and the connection information, wherein the second frequency band is mutually exclusive from the first frequency band, and wherein the first frequency band is used for communication between the UE and the eNB.

20. The UE of claim 19, wherein the AP TX/RX unit is further configured to receive and transmit data from and to the AP through the data transmission/reception connection.

21. An apparatus for controlling a broadcasting signal transmission of an Access Point (AP) located within a coverage area of a base station (eNB), the apparatus comprising:

an AP TX/RX unit configured to:

receive configuration information from the AP, the configuration information being used for the broadcasting signal transmission, and transmit broadcasting signal transmission information to the AP, the broadcasting signal transmission information indicating a set of resource elements at which muting is applied by the eNB, the broadcasting signal transmission information being used for the AP to transmit a broadcasting signal on a first frequency band using the set of resource elements;

a User Equipment (UE) TX/RX unit configured to:

transmit broadcasting signal reception information to a UE based on the device capability information received from the UE, the broadcasting signal reception information being used for the UE to receive the broadcasting signal from the AP, and receive a measurement report of the broadcasting signal from the UE; and a controller configured to:

determine to establish a data transmission/reception connection on a second frequency band between the UE and the AP based on the measurement report, and transmit connection information to the UE, wherein the UE is configured to determine a path loss between the UE and the AP based on the broadcasting signal from the AP and receive an indication identifying the AP, wherein the data transmission/reception connection is established between the UE and the AP on the second frequency band based on the connection information and the determined path loss between the UE and the AP, wherein the second frequency band is mutually exclusive from the first frequency band, and wherein the first frequency band is used for communication between the UE and the eNB.

* * * * *